United States Patent
Min et al.

(10) Patent No.: US 10,444,323 B2
(45) Date of Patent: Oct. 15, 2019

(54) EXPANDABLE, DECENTRALIZED POSITION TRACKING SYSTEMS AND METHODS

(71) Applicant: Position Imaging, Inc., Portsmouth, NH (US)

(72) Inventors: Guohua Min, Exeter, NH (US); Alexander W. Seiger, Concord, NH (US); YiFeng Xiong, Somersworth, NH (US); Edward L. Hill, Exeter, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 131 days.

(21) Appl. No.: 15/446,602

(22) Filed: Mar. 1, 2017

(65) Prior Publication Data

US 2017/0261592 A1    Sep. 14, 2017

Related U.S. Application Data

(60) Provisional application No. 62/305,131, filed on Mar. 8, 2016.

(51) Int. Cl.
| | | |
|---|---|---|
| *G01S 5/14* | (2006.01) | |
| *G01S 5/02* | (2010.01) | |
| *G01S 13/76* | (2006.01) | |

(52) U.S. Cl.
CPC .............. *G01S 5/14* (2013.01); *G01S 5/0226* (2013.01); *G01S 5/0263* (2013.01);
(Continued)

(58) Field of Classification Search
CPC ........ G01S 5/14; G01S 13/765; G01S 5/0289; G01S 5/0226; G01S 5/0294; G01S 5/0263
See application file for complete search history.

(56) References Cited

U.S. PATENT DOCUMENTS

| 2,408,122 A | 9/1946 | Wirkler |
|---|---|---|
| 3,824,596 A | 7/1974 | Guion et al. |

(Continued)

FOREIGN PATENT DOCUMENTS

| WO | 2001006401 A1 | 1/2001 |
|---|---|---|
| WO | 2005010550 A1 | 2/2005 |

OTHER PUBLICATIONS

Proakis, John G. and Masoud Salehi, "Communication Systems Engineering", Second Edition, Prentice-Hall, Inc., Upper Saddle River, New Jersey, 2002; 815 pages.

(Continued)

*Primary Examiner* — Brandon J Miller
(74) *Attorney, Agent, or Firm* — Schmeiser, Olsen & Watts LLP

(57) ABSTRACT

Systems and methods for position tracking include at least three spatially separated radio-frequency (RF) sources of radio signals. Each RF source is disposed in an area at a location known to that RF source. Each RF source includes an RF transmitter configured to transmit radio signals that carry a unique identifier and the known location of that RF source. The position tracking system and method include at least one tag. Each tag is coupled to a different mobile object and includes a radio module with an RF receiver for receiving the radio signals transmitted by the at least three spatially separated RF sources. Each tag further includes memory and a processor that executes executable code stored in the memory to compute a range from that tag to each of the at least three RF sources and to compute a position of that tag based on at least three computed ranges.

18 Claims, 13 Drawing Sheets

(52) U.S. Cl.
CPC .......... *G01S 5/0289* (2013.01); *G01S 5/0294*
(2013.01); *G01S 13/765* (2013.01)

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James |
| 6,697,736 B2 | 2/2004 | Lin |
| 6,721,657 B2 | 4/2004 | Ford et al. |
| 6,744,436 B1 | 6/2004 | Chirieleison et al. |
| 6,750,816 B1 | 6/2004 | Kunysz |
| 6,861,982 B2 | 3/2005 | Forstrom et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,236,092 B1 | 6/2007 | Joy |
| 7,292,189 B2 | 11/2007 | Orr et al. |
| 7,295,925 B2 | 11/2007 | Breed et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,844,507 B2 | 11/2010 | Levy |
| 7,868,760 B2 * | 1/2011 | Smith .............. G01S 13/767 340/10.1 |
| 7,876,268 B2 | 1/2011 | Jacobs |
| 7,933,730 B2 | 4/2011 | Li et al. |
| 8,269,624 B2 | 9/2012 | Chen et al. |
| 8,457,655 B2 | 6/2013 | Zhang et al. |
| 8,749,433 B2 | 6/2014 | Hill |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander |
| 9,482,741 B1 | 11/2016 | Min et al. |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2 | 4/2018 | Hill et al. |
| 9,961,503 B2 | 5/2018 | Hill |
| 10,180,490 B1 | 1/2019 | Schneider et al. |
| 2002/0021277 A1 | 2/2002 | Kramer et al. |
| 2002/0140745 A1 | 10/2002 | Ellenby |
| 2003/0053492 A1 | 3/2003 | Matsunaga |
| 2003/0120425 A1 | 6/2003 | Stanley et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0176102 A1 | 9/2004 | Lawrence et al. |
| 2004/0203846 A1 | 10/2004 | Caronni et al. |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 * | 9/2007 | Panotopoulos .... G06K 19/0705 340/572.1 |
| 2007/0222560 A1 | 9/2007 | Posamentier |
| 2008/0048913 A1 | 2/2008 | Macias et al. |
| 2008/0143482 A1 * | 6/2008 | Shoarinejad ............ G01S 7/003 340/10.1 |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 * | 11/2012 | Hsiao .................. G08B 25/016 340/8.1 |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0036043 A1 | 2/2013 | Faith |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0039458 A1 | 2/2015 | Reid |
| 2015/0055821 A1 | 2/2015 | Fotland |
| 2015/0091757 A1 | 4/2015 | Shaw et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman |
| 2015/0379366 A1 | 12/2015 | Nomura |
| 2016/0035078 A1 | 2/2016 | Lin |
| 2016/0098679 A1 | 4/2016 | Levy |
| 2016/0142868 A1 | 5/2016 | Kulkarni et al. |
| 2016/0150196 A1 * | 5/2016 | Horvath ................ H04N 5/247 348/211.4 |
| 2016/0156409 A1 | 6/2016 | Chang |

(56) References Cited

U.S. PATENT DOCUMENTS

| | | |
|---|---|---|
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill |
| 2017/0031432 A1 | 2/2017 | Hill |
| 2017/0234979 A1 | 8/2017 | Mathews et al. |
| 2017/0280281 A1 | 9/2017 | Pandey et al. |
| 2017/0323174 A1 | 11/2017 | Joshi et al. |
| 2017/0350961 A1 | 12/2017 | Hill |
| 2017/0372524 A1 | 12/2017 | Hill |
| 2018/0068266 A1 | 3/2018 | Kirmani |
| 2018/0164103 A1 | 6/2018 | Hill |
| 2018/0197139 A1 | 7/2018 | Hill |
| 2019/0090744 A1 | 3/2019 | Mahfouz |

OTHER PUBLICATIONS

Schmidt & Phillips, "INS/GPS Integration Architectures", NATO RTO Lecture Seriers, First Presented Oct. 20-21, 2003; 24 pages.

J. Farrell & M. Barth, "The Global Positioning System & Inertial Navigation" pp. 245-252 (McGraw-Hill,1999).

Grewal & Andrews, "Global Positioning Systems, Inertial Nagivation, and Integration", 2001, John Weiley and Sons, pp. 252-256.

"Development of a Precise GPS/INS/On-Board Vehicle Sensors Integrated Vehicular Positioning System," Jianchen Gao, UCGE Reports No. 20255, Jun. 2007.

Goodall, Christopher L., "Improving Usability of Low-Cost INS/GPS Navigation Systems using Intelligent Techniques", Jan. 2009, UCGE Reports No. 20276; 234 pages.

Vikas Kumar N., "Integration of Inertial Navigation System and Global Positioning System Using Kalman Filtering", M.Tech Dissertation, Indian Institute of Technology, Bombay, Mumbai, Jul. 2004; 69 pages.

Filho, et al., "Integrated GPS/INS Navigation System Based on a Gyrpscope-Free IMU", DINCON Brazilian Conference on Synamics, Control, and Their Applications, May 22-26, 2006; 6 pages.

"ADXUADXL210 Product Sheet", Analog Devices, Inc., Analog.com, 1999; 11 pages.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Yang, Yong, "Tightly Coupled MEMS INS/GPS Integration with INS Aided Receiver Tracking Loops", Jun. 2008, UCGE Reports No. 20270; 205 pages.

Sun, Debo, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

"Integration of a GPS aided Strapdown Inertial Navigation System for Land Vehicles," Adrian Schumacher, KTH Electrical Engineering, XR-EE-SB 2006:006.

Gautier, Jennifer Denise, "GPS/INS Generalized Evaluation Tool (GIGET) for the Design and Testing of Integrated Navigation Systems", Dissertation, Stanford University, Jun. 2003; 160 pages.

"Real-time differential Carrier Phase GPS-Aided INS," Jay Farrell, tony Givargis, Matthew Barth, IEEE Transactions on control Systems Technology, vol. 8, No. 4, Jul. 2000.

Alban, Santiago, "Design and Performance of a Robust GPS/INS Attitude System for Automobile Applications", Dissertation, Stanford University, Jun. 2004; 218 pages.

U.S. Appl. No. 13/975,724, filed Aug. 26, 2013, entitled, "Radio Frequency Communication System" 22 pages.

Li, et al. "Multifrequency-Based Range Estimation of RFID Tags," IEEE International Conference on RFID, 2009.

Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.

Hill, et al. "Position Tracking System and Method Using Radio Signals and Inertial Sensing" U.S. Appl. No. 14/600,025, filed Jan. 20, 2015.

Hill, et al. "Spatial Diveristy for Relative Position Tracking" U.S. Appl. No. 15/404,668, filed Jan. 12, 2017.

Hill, Edward L. "Wireless Relay Station for Radio Frequency-Based Tracking System" U.S. Appl. No. 15/961,274, filed Apr. 24, 2018.

Hill, et al. "Package Tracking Systems and Methods" U.S. Appl. No. 15/091,180, filed Apr. 5 2016.

Seiger, et al. "Modular Shelving Systems for Package Tracking" U.S. Appl. No. 15/270,749, filed Sep. 20, 2016.

Hill, et al. "Video for Real-Time Confirmation in Package Tracking Systems" U.S. Appl. No. 15/416,366, filed Jan. 26, 2017.

Piotrowski, et al. "Light-Based Guidance for Package Tracking Systems" U.S. Appl. No. 15/416,379, filed Jan. 26, 2017.

Hill, et al. "Position Tracking System and Method Using Radio Signals and Inertial Sensing" U.S. Appl. No. 13/293,639, filed Nov. 10, 2011.

Min, et al. "Systems and Methods of Wireless Position Tracking" U.S. Appl. No. 15/953,798, filed Apr. 16, 2018.

Farrell & Barth, "The Global Positioning System & Inertial Navigation", 1999, McGraw-Hill; pp. 246-252.

Grewal & Andrews, "Global Positioning Systems, Inertial Navigation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555; 245 pages.

Yong Yang, "Tightly Coupled MEMS INS/GPS Integration with INS Aided Receiver Tracking Loops", Jun. 2008, UCGE Reports No. 20270; 205 pages.

Debo Sun, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. Nov. 14, 2016 IDS11-14-2016 IDS11-14-2016 IDSVII, Part B5.; 8 pages.

Schmidt & Phillips, "INS/GPS Integration Architectures", NATO RTO Lecture Series, First Presented Oct. 20-21, 2003; 24 pages.

Adrian Schumacher, "Integration of a GPS aided Strapdown Inertial Navigation System for Land Vehicles", Master of Science Thesis, KTH Electrical Engineering, 2006; 67 pages.

Vikas Numar N., "Integration of Inertial Navigation System and Global Positioning System Using Kalman Filtering", M.Tech Dissertation, Indian Institute of Technology, Bombay, Mumbai, Jul. 2004; 69 pages.

Jennifer Denise Gautier, "GPS/INS Generalized Evaluation Tool (GIGET) for the Design and Testing of Integrated Navigation Systems", Dissertation, Stanford University, Jun. 2003; 160 pages.

Farrell, et al., "Real-Time Differential Carrier Phase GPS-Aided INS", Jul. 2000, IEEE Transactions on Control Systems Technology, vol. 8, No. 4; 13 pages.

Santiago Alban, "Design and Performance of a Robust GPS/INS Attitude System for Automobile Applications", Dissertation, Stanford University, Jun. 2004; 218 pages.

International Search Report & Written Opininon in PCT/US12/64860, dated Feb. 28, 2013; 14 pg.

U.S. Appl. No. 13/918,295, filed Jun. 14, 2013, entitled, "RF Tracking with Active Sensory Feedback"; 31 pages.

Pourhomayoun, Mohammad and Mark Fowler, "Improving WLAN-based Indoor Mobile Positioning Using Sparsity," Conference Record of the Forty Si11-14-2016 IDSth Asilomar Conference on Signals, Systems and Computers, Nov. 4-7, 2012, pp. 1393-1396, Pacific Grove, California.

(56) References Cited

OTHER PUBLICATIONS

"ADXL202/ADXL210 Product Sheet," Analog Devices, Inc., Analog.com, 1999; 11 pages.

Wilde, Andreas, "Extended Tracking Range Delay-Locked Loop," Proceedings IEEE International Conference on Communications, Jun. 1995, pp. 1051-1054.

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

\* cited by examiner

EXPANDABLE, DECENTRALIZED POSITION TRACKING SYSTEMS AND METHODS

RELATED APPLICATION

This application claims the benefit of and priority to co-pending U.S. provisional application No. 62/305,131, filed Mar. 8, 2016, titled "Expandable, De-centralized Tracking and Communication System," the entirety of which is incorporated by reference herein.

FIELD OF THE INVENTION

The present invention relates generally to a system and method for tracking the location of multiple tags attached to, placed on, or embedded in mobile objects, and particularly to tags used within a decentralized system that is capable of tracking the locations of multiple tags through a self-configuring network and of communicating with outside networks.

BACKGROUND

Some existing tracking systems track an object having a radio frequency (RF) receiver within a transmission range of several RF transmitters. If, however, the object leaves the range of the RF transmitters, tracking cannot occur unless one adds more RF transmitters to expand the tracking region. Each newly added RF transmitter requires calibration to determine its position, an operation that can be tedious and time consuming.

Other tracking systems, such as GPS and cellular tracking, provide precise geo-location, but do not operate well indoors or in enclosed spaces (such as in a vehicle). GPS and cellular solutions also lack the accuracy required for certain applications.

Some wired tracking systems connect RF transmitters to a central controller and can synchronize the transmitters. Adding new RF transmitters to expand the tracking area, however, requires linking by wiring.

Centralized tracking systems have a central controller that typically controls when each RF transmitter is to transmit its RF signal. Systems having a central controller require reconfiguration when the system changes, such as adding or deleting a node. In contrast, decentralized systems that lack a central controller are exposed to the risk of multiple RF transmitters transmitting at the same time, potentially causing collisions between radio signals. During these collisions, part or all of a transmitted message may be lost.

Some existing wireless tracking systems require a central controller to handle the position calculation and networking functions. With these systems, an object being tracked transmits RF signals that are received by a plurality of RF receivers. The RF receivers are coupled to a central controller, which receives the signals, calculates the distance (range) from the RF transmitter to each RF receiver, and calculates the location of the RF transmitter in space. These systems encounter many trade-offs among important factors, such as power usage, position accuracy, cost, system control, and tracking range of the system.

In 2013, the Apple® Corporation of Cupertino Calif. introduced iBeacon™, a technology that uses low power Bluetooth® to transmit a beacon identifier to nearby electronic devices. The Meacon™ technology uses Bluetooth® low energy proximity sensing to determine the range to an electronic device (e.g., cell phone) passing near the beacon. Location-based actions (e.g., push advertising, check in) can then be activated by proximity detection. Such systems, however, are proximity detectors, not tracking systems. These proximity or range detection systems are interested in the registration of a wireless user, for purposes of communications and marketing.

In addition, wireless tracking systems in general suffer from RF interference that affects the received radio signal. If an RF transmitter and RF receiver are communicating on a narrow RF frequency band, and the RF interference is especially strong within this band, the signal can be obscured by the interference and measurements, and both position tracking and proximity detection, are affected.

SUMMARY

All examples and features mentioned below can be combined in any technically possible way.

In one aspect, a position tracking system comprises at least three spatially separated radio-frequency (RF) sources of radio signals. Each RF source is disposed in an area at a location known to that RF source. Each RF source includes an RF transmitter configured to transmit radio signals that carry a unique identifier and the known location of that RF source. Each of at least one tag is coupled to a different mobile object. Each tag includes a radio module with an RF receiver for receiving the radio signals transmitted by the at least three spatially separated RF sources, memory storing executable code, and a processor that executes the executable code stored in the memory to compute a range from that tag to each of the at least three spatially separated RF sources and to compute a position of that tag based on at least three computed ranges.

One or more of the at least three spatially separated RF sources of radio signals can be a stationary node. One or more of the at least three spatially separated RF sources of radio signals can be an uplink node having an uplink module that is in communication with an external network and configured to send the computed position of the at least one tag to a server system on the external network. The uplink node can be a configuration node, and the processor of the configuration node can be configured to command a given RF source of the at least three RF sources to enter tag mode in which the given RF source computes its location.

One of the at least three spatially separated RF sources of radio signals can be a second tag of the at least one tag. A given tag of the at least one tag can include a barometric sensor, and the processor of the given tag can compute the position of that tag based on the at least three computed ranges and on a pressure measurement made by the barometric sensor.

Each of the at least three RF sources can include a barometric sensor for making pressure measurements, and the radio module of the given tag can include an RF transmitter, the processor of the given tag can be configured to cause the RF transmitter to send a message addressed to a specific RF configured to send a message to a specific RF source of the at least three RF sources. The message can request a pressure measurement made by the barometric sensor of that specific RF source. The RF receiver of the given tag can receive a reply message containing the pressure measurement made by the barometric sensor of the specific RF source, and the processor of the given tag can be configured to adjust the pressure measurement made by the barometric sensor of the given tag in response to the pressure measurement received from the specific RF source before computing the position of the tag based on the at least three computed ranges and on the pressure measurement made by the barometric sensor of the given tag. The processor of the given tag can be configured to select the specific RF source from among the at least three RF sources in order to send the message requesting a pressure measurement based on proximity to the given tag.

A given tag of the at least one tag can further include an accelerometer that detects when the given tag moves and when the tag is stationary, and the processor of the given tag can be configured to place the given tag in sleep mode to conserve power when the given tag ceases moving and becomes stationary. The radio module of the given tag can includes an RF transmitter, and the processor of the given tag can be configured to cause the given tag to exit sleep mode and the RF transmitter to send a message addressed to a specific RF source of the at least three RF sources in response to the accelerometer detecting motion of the given tag. The message can include the position computed by the given tag and request that the computed position of the given tag be sent to an RF source in communication with an external network.

The radio module of a given tag of the at least one tag can include an RF transmitter, and the processor of the given tag can be configured to cause the RF transmitter to send a message addressed to a specific RF source of the at least three RF sources. The message can contain the position computed by the given tag and request that the computed position of the given tag be sent to an RF source in communication with an external network. The processor of the given tag can be configured to place the given tag in sleep mode to conserve power after sending the message that requests the computed position of the given tag be sent to an RF source in communication with an external network.

In another aspect, a method of position tracking system comprises receiving, by a tag coupled to a mobile object, radio signals from at least three spatially separated radio-frequency (RF) sources, acquiring, by the tag, a unique identifier for and known location of each of the at least three RF sources from the radio signals received from that RF source, computing, by the tag, a range to each of the at least three RF sources from communications exchanged with that RF source, and computing, by the tag, a three-dimensional position based on the computed ranges to the at least three RF sources.

The method can further comprise measuring, by the tag, pressure; and wherein computing, by the tag, the three-dimensional position of the tag based on the computed ranges to the at least three RF sources can be further based on the pressure measured by the tag. A message can be sent to a physically closest RF source of the at least three RF sources. The tag can receive a reply message containing pressure data from the physically closest RF source of the at least three RF sources in response to the sent message. The pressure measured by the tag can be adjusted in response to the pressure data received from the physically closest RF source of the at least three RF sources before computing the three-dimensional position of the tag based on the computed ranges to the at least three RF sources and on the pressure measured by the tag.

The tag may detect when the tag moves and when the tag is stationary, and the tag may enter sleep mode to conserve power when the tag ceases moving and becomes stationary. The tag can exit sleep mode and transmit the computed position in a message addressed to a specific RF source of the at least three RF sources in response to detecting motion of the tag. The message can request that the specific RF source forward the computed position to an RF source that is in communication with an external network. The tag can transmit the computed position in a message addressed to a specific RF source of the at least three RF sources; the message can request that the computed position of the given tag be sent to an RF source in communication with an external network. The tag can be placed in sleep mode to conserve power after transmitting the computed position in the message addressed to the specific RF source of the at least three RF sources.

In still another aspect, a decentralized position tracking system comprises at least one tag, each coupled to a different mobile object. Each tag includes a radio module with a radio-frequency (RF) transmitter for transmitting radio signals, memory storing executable code, and a processor that executes the executable code stored in the memory to cause the RF transmitter to transmit radio signals carrying a message that contains a three-dimensional position of that tag. The decentralized position tracking system further comprises least three spatially separated RF sources of radio signals. One of the at least three RF sources is an uplink node configured with an uplink module that is in communication with an external network. Each RF source is disposed in an area at a location known to that RF source. Each RF source has an RF receiver, an RF transmitter, and a processor. The RF receiver of a given RF source of the at least three RF sources receives the radio signals carrying the message that contains the position of the tag. The processor of the given RF source is configured to acquire the position of the tag from the message and to direct the RF transmitter to transmit radio signals carrying the position of the tag in a second message addressed to the uplink node. The RF receiver of the uplink node receives the second message and the processor of the uplink node acquires the position of the tag from the second message and causes transmission of the position of the tag over the external network.

The decentralized position tracking system can further comprise a new RF source that is being added to the position tracking system. The new RF source has an RF transmitter, an RF receiver, and a processor. The processor determines a range to each of the at least three RF sources and computes a three-dimensional position of the new RF source based on the determined ranges.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Decentralized position tracking systems described herein improve upon current Real-time Locating Systems (RTLS) by providing a wireless position tracking system that requires no central controller or server for position calculation and network functions. Based on radio-frequency (RF) transmissions, the wireless position tracking system self-configures, can be easily deployed and expanded, is less susceptible to RF signal collisions, and has improved RF interference rejection capabilities. In addition, the RF transmissions provide a stable and accurate signal for tracking tags (i.e., RF transmitting devices described in more detail below), at a power level that does not limit tag battery life.

Figure 1:
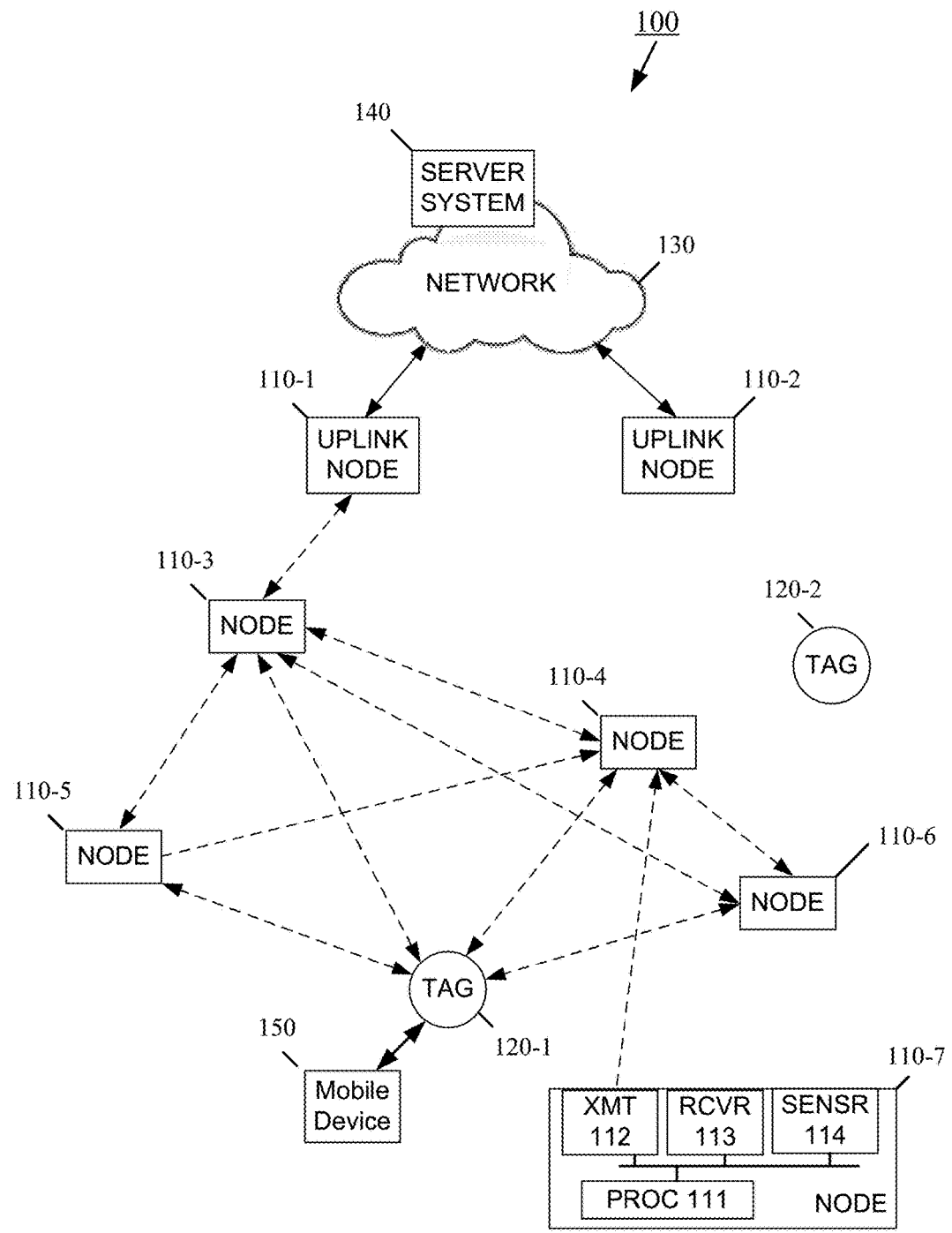
FIG. 1 is a diagram of an embodiment of a decentralized position tracking system, having two tags and a self-configuring network of nodes, including an uplink node that is in communication with an external network.

FIG. 1 shows an embodiment of a decentralized position tracking system 100 including a plurality of nodes 110-1, 110-2, 110-3, 110-4, 110-5, 110-6, and 110-7 (generally, node 110) and two tags 120-1, 120-2 (generally, tag 120). Other embodiments of the decentralized position tracking system 100 can have fewer or more nodes and tags than shown without departing from the principles described herein.

A node 110 is in general a radio communications device. Referring to node 110-7 as an illustrative example of a node 110, each node 110 has a processor 111, an RF transmitter and transmitting antenna 112 for transmitting RF signals carrying, for example, a unique ID indicating its identity and its location; and a receiver and receiving antenna 113 for listening to RF signals for messages sent to the node. (The transmitter and receiver can be embodied in a transceiver, the transmitting and receiving antenna can share a single antenna). In one embodiment, a node 110 includes a barometric pressure sensor 114 for measuring pressure. Each node 110 operates as a reference point, or beacon, by transmitting its location. The node 110 can include its measured pressure in the RF signals carrying its unique ID and location.

Each node 110 is stationary, being temporarily or permanently placed at a known location within a region. As used herein, a location, which may also be referred to as a position, has three-dimensional coordinates (x, y, z). The pressure measured by the node 110 can serve to determine the height, or vertical coordinate, of the node 110 (i.e., a z coordinate that is perpendicular to both the x- and y-axis coordinates).

The node 110 can come to know its own location in different ways. One way occurs at the beginning of system setup; the position tracking system 100 may implement an auto-calibration procedure in which several other nodes are placed at known locations. A given node 110 attempting to determine its position communicates with these other nodes to acquire their known locations. To determine its unique location, the given node requires the positions of at least three other nodes. After the given node determines its location, other nodes can use this known location as a reference (with the known locations of at least two other nodes) to determine their own locations.

For example, consider in FIG. 1 that nodes 110-5, 110-6, and 110-7 have been calibrated and know their locations, and that node 110-4 does not know its location, but can communicate with nodes 110-5, 110-6, and 110-7 to receive RF signals (dashed arrows) carrying the identifications and known locations of these nodes. Node 110-4 then determines its location from these RF signals by performing calculations that determine its distance from each of the nodes 110-5, 110-6, and 110-7. Then node 110-4 uses these three calculated distances to calculate its location using multilateralization. One technique for initial localization using known fixed points is disclosed in U.S. Pat. No. 9,482,741, issued Nov. 1, 2016, the entirety of which patent is incorporated by reference herein. Similarly, node 110-3 can now determine its own location by communicating with nodes 110-4, 110-5, and 110-6. This process of location self-determination cascades throughout the network of nodes 110, effectively self-calibrating each node 110 within the decentralized position tracking system 100.

Advantageously, the position tracking system 100 is capable of tracking tags without a central controller or server input. Because there may be no central controller used for tracking tags, at least one of the nodes 110 may be configured with an uplink module that enables that node 110 to communicate with an outside network 130, such as the Internet. Such a node is referred to herein as an uplink node. In general, an uplink node operates like a node 110 that does not have an uplink module, but with additional roles. Such roles of an uplink node include receiving tag positions from other connected nodes and relaying these tag positions to a server 140 on the outside network 130. Accordingly, an uplink node can communicate information from and about the tags 120 outside of the position tracking system 100. An uplink node can also push data to specific nodes and, therefore, can be directed from the external network 130 to reconfigure and update individual nodes.

The uplink module also gives an uplink node 110 the role of responding to a packet that requests a tag position update. The uplink node responds by sending the tag position through a data connection to the uplink module, instead of forwarding the packet in a radio transmission, which would be performed by nodes not having an uplink module. In addition, an uplink node responds to uplink node position requests with its own known position.

For purposes of illustration, in FIG. 1, nodes 110-1 and 110-2 are uplink nodes that are in communication with the outside network 130, node 110-1 being the main uplink node, and node 110-2 being a backup uplink node. The position tracking system can have multiple main uplink nodes (and multiple backup nodes) concurrently in communication with the outside network 130. A role of a main uplink node is to forward tag positions to the server system 140 on the outside network 130; a role of a backup node is to assume the role of a main uplink node in the event a main uplink node fails, thereby mitigating the risk of being unable to communicate the tracked positions of tags in the event that a main uplink node fails.

Figure 2:
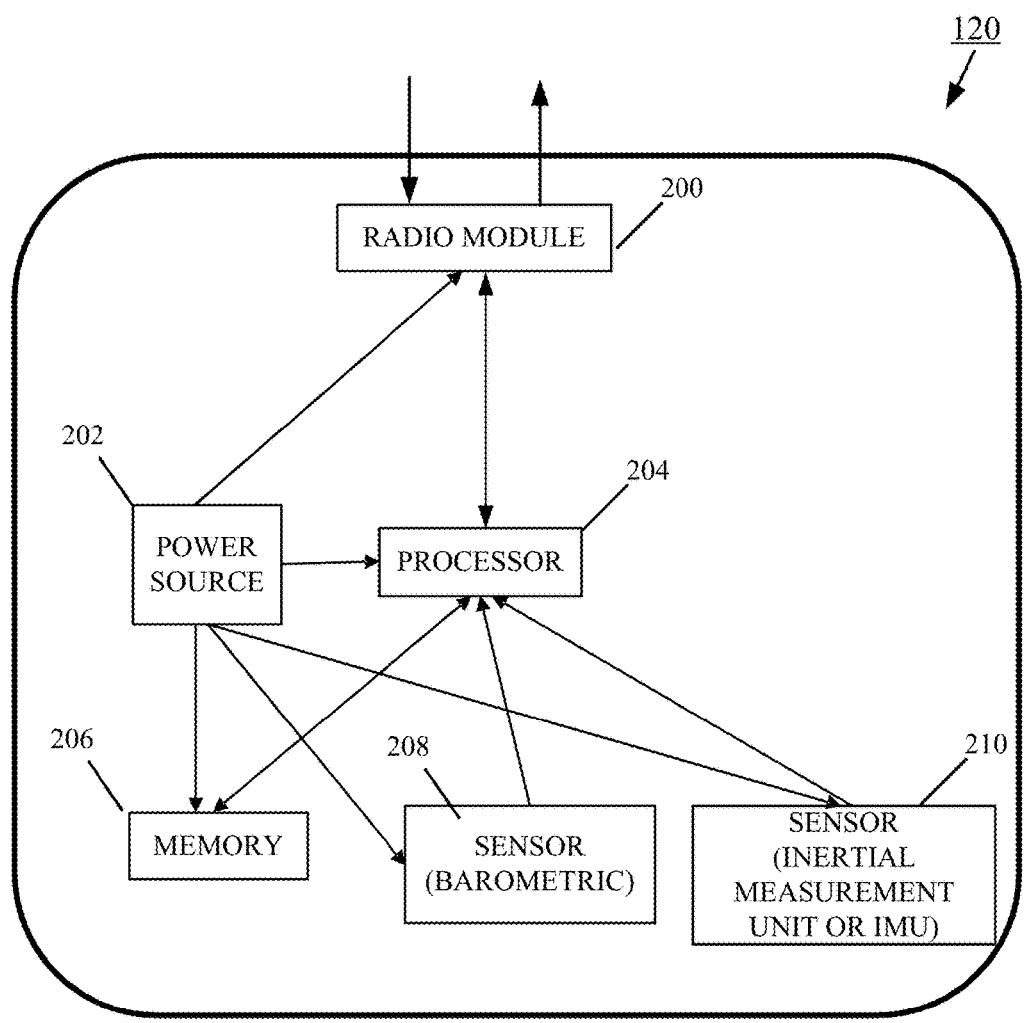
FIG. 2 is a block diagram of an embodiment of a tag.

In general, a tag 120 is an RF transmitting and receiving radio device attached to, embedded in, disposed on, or coupled to, a mobile object that is to have its position tracked. The tag 120 may be worn or carried by a person. FIG. 2 shows an embodiment of a tag 120, including a radio module 200, a power source 202, a processor 204, memory 206, an optional sensor 208 that measures barometric pressure, and an optional inertial measurement unit (IMU) 210 that measures motion of the tag 120. The IMU 210 includes an accelerometer to measure force in each of three axes, a gyro for measuring angular velocity, and a magnetometer to measure magnetic fields.

The radio module 200 includes an RF transceiver for communicating with other tags 120 and nodes 110 using radio signals. In one embodiment, ultra-wide band (UWB) technology, having a transmit band between 3.1 GHz to 10.6 GHz, is employed for communication. The combination of high-frequency communication for accuracy with wide bandwidths for stable communication make ultra-wide band a technology suited for time-based location or position tracking systems, particularly when these tracking systems require or are improved by accurate tag position tracking. UWB transmitters and receivers (or integrated UWB transceivers) are generally resistant to narrow band noise and may be configured to transmit using less power than other transmission methods.

In one embodiment, the radio module 200 is a Decawave DW1000 Chip produced by DecaWave, headquartered in Dublin, Ireland. The Decawave is a single chip ultra-wide band transceiver that can communicate via a dedicated SPI port and is designed for use in RTLS (real-time location system). Other UWB transceiver chips or circuitry may be used. Although wide-band communication like ultra-wideband is a solution for accurate range detection, any method for determining the range and sending data between two transceivers can be used to implement the position tracking system 100.

The power source 202, which may be a battery, provides power to each of the other components of the tag 120, namely, the processor 204, memory 206, and sensors 208, 210.

The processor 204 may be, for example, a STM32F105RCT6 microcontroller, manufactured by STMicroelectronics, headquartered in Geneva, Switzerland. The processor 204 is in communication with the radio module 200, the memory 206, and the sensors 208, 210.

At least a portion of the memory 206 is non-volatile and stores executable code that is executed by the processor 204. Information intended to remain unchanged after the tag 120 is powered down, for example, configuration data, is kept in non-volatile memory. Some of the memory 206 is used as scratch memory, for storing information and tables. Information that can be deleted when the tag 120 powers down is stored in a portion of the memory 206 that is volatile. The memory 206 may either be stand-alone memory or incorporated into the processor 204 or other electronics. In one embodiment, the non-volatile portion of the memory 206 is EEROM (electrically erasable read-only memory) and can communicate via SPI (serial peripheral interface).

An optional first sensor 208 measures barometric pressure in the surrounding environment of the tag 120. The processor 204 uses the difference in the barometric pressure measurements between the tag 120 and the node (or nodes) within the tag's geographic area and, using a standard barometric pressure for a known altitude, determines the estimated height, namely, the z coordinate, of the tag 120 in space. The first sensor 208 can be implemented using a Bosch BME280 atmospheric sensor manufactured by Bosch Sensortec GmbH of Reutlingen, Germany, and communicate via an I²C bus. The tag 120 may also include one or more other types of environment sensors in addition to barometric pressure sensors, examples of which include, but are not limited to, temperature and humidity sensors.

Optionally, the tag 120 includes an inertial measurement unit 210 for measuring motion of the tag 120 along any of the three axes (x, y, z). The measured motion may include acceleration and deceleration of the tag. One embodiment for implementing the inertial measurement unit 210 is the Bosch Sensortec BNO055 Intelligent 9-Axis Absolute Orientation Sensor, manufactured by Bosch Sensortec GmbH of Reutlingen, Germany.

Optionally, tag 120 may include an analog-to-digital (ADC) converter (not shown) connected to a voltage divider (not shown) to measure raw battery voltage, a USB (universal serial bus) full-speed interface (not shown), a GPIO (general purpose input/output) (not shown) connected to enable pin of LDO (low-dropout) regulator (not shown) that enables the processor 204 to power down the tag 120, and a Bluetooth® transceiver (not shown) for communicating with a smart device (e.g., smart device 150 in FIG. 1).

Tag operation occurs in three main modes: (1) a node discovery mode; (2) a position ranging mode; and (3) a sleep mode. In the node discovery mode, a tag 120 transmits tag announcement messages. These messages are received by all nodes 110 in range of the tag 120; all such nodes 110 receiving these messages send a reply message back to the tag 120. The tag 120 then assembles the information gathered from these reply messages into a table that stores the physical positions of all of the nearby nodes, an identification of each node, the special capabilities (if any) of each node, and the addresses of the nodes.

In the position ranging mode, a tag 120 interacts with nodes selected from the table that was assembled while operating in the node discovery mode. From these communications, the tag 120 computes and stores a range to each of the selected nodes based on comparisons and analysis of the received RF signals. Each time the tag completes a run-through of the discovered nearby nodes and receives a pressure reference from the closest node or all nodes, depending on the particular implementation, the processor 204 runs a location algorithm (executable code stored in the memory 206). The tag determines its location relative to these nodes, as detailed below, based on the physical positions and barometric information received from proximate responding nodes.

In the sleep mode, the tag 120 ceases communications during certain periods to conserve battery life. Accordingly, the position tracking system 100 can accommodate extremely low-power situations, as the location algorithm produces a position with each iteration, and the tag can be put into the sleep mode between each position update.

Returning to FIG. 1, tags can also enter a mode in which they act like nodes to facilitate a system installation or expansion process. In effect, a tag can operate as a node that can be used by other tags and nodes to determine their own positions. For example, node 110-6 may not be within transmission range of enough nodes to calculate its own position (consider, in FIG. 1, that node 110-6 is in range of only nodes 110-3 and 110-4, and that tag 120-1 subsequently moves into range of node 110-6 and of three nodes 110-3, 110-4, and 110-5 with known locations. The tag 120-1 can determine its own position based on ranges determined for these three nearby nodes 110-3, 110-4, and 110-5, as described in more detail below. When operating in this node mode, the tag 120-1 stores its determined position (e.g., in non-volatile memory) and transmits its position in response to any node announcement messages it receives. Because the tag 120-1 transmits and receives RF signals according to the same predetermined protocol used by the nodes 110, the tag 120-1 can operate as a third node with a known location for node 110-6 to now compute its own position.

Conversely, a node 110 can enter a tag mode when the node detects that it is moving (for this purpose, the node can optionally include an accelerometer). The node remains in tag mode until it becomes stationary again. This flexibility allows for installation of additional nodes and protects against the possible situation where a node reports a position that is far from its actual position if it is later moved.

Tags 120 discover nodes 110 in real time as the tag 120 comes in and out of range of the nodes 110. The tracked area coverage can expand without new calibration or synchronization functions as the tags 120 travel to areas beyond the range of the initial RF nodes 110. Adding more RF nodes within the tracked area is simplified because the nodes automatically locate themselves, using the position and range information for multiple existing nodes in the currently existing network of nodes, to calculate new node positions. The RF nodes also adapt to the disappearance or deletion of RF nodes from the tracked area.

A tag 120 worn on or carried by a person may use Bluetooth® or other data connection to a smart device 150, such as smartphone. The tag 120 can further use a positioning algorithm to provide its position information to a higher-level application running on the device 150. For example, the executing application may enable the person to see their location on a map displayed on the smart device screen. The position information can also be sent to an uplink node (described later) for processing.

Each node 110 and tag 120 processes received RF communications and retransmits RF signals according to a predetermined protocol. This protocol includes certain request messages and reply messages (some messages, such as node announcements, can be used as a request or a reply, depending on the particular situation). Request messages include node announcements, tag announcements, ranging requests, pressure reference requests, uplink node position requests, tag position update requests, and acknowledgement requests.

Nodes 110 transmit node announcement messages when attempting to locate neighboring nodes, uplink node position requests when attempting to establish the identity of the uplink node, uplink node pair requests when attempting to pair with an identified uplink node, and acknowledgement requests when attempting to confirm receipt of a transmitted frame. Each Node 110 is configured to keep track of the position of a known uplink node; at power-up, the node 110 transmits an uplink node position request until it receives an uplink node position reply from either the actual uplink node or from another node 110 that already has determined the position of the uplink node.

Tags 120 transmit tag announcement messages (also referred to as node discovery requests) when attempting to discover neighboring nodes, ranging request messages when attempting to determine distance to a discovered node, pressure reference requests when attempting to obtain a pressure measurement taken by a node, and tag position update messages when attempting to have a node forward the tag's position to an uplink node. A tag position update message is a network frame (or packet) that is sent from a tag to an adjacent node and contains the (x, y, z) position of the tag, the address of the tag (i.e., unique identifier), and other diagnostic information, for example, battery capacity or environmental data. Such messages may be sent by the tag to a node in response to receiving a node announcement message from that node, or such messages can be automatic replies sent by the tag periodically or every time the tag moves. Tag position update messages come from tags only, and any receiving node 110 is responsible for repackaging the data into a network packet and sending the data to the uplink node 110-1. Tag position update messages are forwarded to the uplink node over the network of nodes, and are sent as datagrams (i.e., to minimize bandwidth requirements, the uplink node does not transmit an acknowledgement).

Reply messages include node announcements, ranging replies, pressure reference replies, uplink node position replies, tag position updates, and acknowledgements. Nodes 110 send node announcement messages in reply to node discovery requests from tags, ranging replies in response to ranging requests from tags, and pressure reference replies in response to pressure reference requests from tags. Nodes 110 also respond to two other messages required for passing tag position messages to the main uplink node: the uplink node position request and the tag position update request. A node 110 that has not determined the uplink node position does not respond to node discovery requests or to uplink node position requests, so that only nodes 110 with all relevant information are used by tags to determine positioning.

Position information of a tag can be sent from the position tracking system 100 to the server 140 on the external network 130 in multiple ways. Because the position tracking system 100 has no central location engine, each tag 120 is aware of its position only, and not the position of other tags. Therefore, if a central server 140 needs to know the locations of multiple tags 120, the tags 120 need to send their locations across the network of nodes 110 to the uplink node 110-1. For tags 120 with a very low update rate, or for tags that are attached to assets, the UWB radio interface (200, FIG. 2) may only be initiated and used to relay position information to a nearby node when such information is requested. These requests may be active inquiries from a node to the tag, pre-arranged initiated position communication transmissions through a designated duty cycle programmed in the tag, or when a motion sensor in the tag senses movement alerting the tag to initiate its radio to communicate its position to a node.

Because the position tracking system 100 can be installed to cover very large areas, a next-hop routing protocol (NHRP) is effective for UWB position messages to be relayed to the uplink node 110-1, and from there to interested users, such as a cloud server, central server 140, or local user. NHRP uses techniques familiar to those skilled in the art to determine the most direct, fastest, and/or fewest hops across network connections between a sending unit and a receiving unit. To accomplish this, in one embodiment, at power-up of the position tracking system 100, each node 110 sends broadcast packets (called network frames) asking for the position of an uplink node. When each node 110 learns this information, it is internalized and then propagated through the network. When a node receives a tag position update message from a tag 120, it knows that this message is supposed to be relayed back to the central server 140 through the uplink node 110-1 using the NHRP, and chooses to send this message to the nearby node that is closest to the uplink node 110-1. This happens as many times as necessary, hopping between nodes, until the uplink node 110-1 finally pushes the information to an off-site cloud server or other recipient. An acknowledgement message is then propagated from the uplink node to the transmitting node 110 confirming the packet. Using this NHRP it can be confirmed that all nodes are linked and the position tracking system can communicate with other systems using the uplink node 110-1.

Note that by using this method of communication, the network of nodes follows the shortest physical path. In the event a tag position update message from a tag cannot be successfully transmitted to a node chosen by the NHRP, the node responsible for relaying the information picks the next closest node to the uplink node 110-1. This allows the network of nodes to robustly recover from periodic disturbances or the inadvertent shutdown of a node.

For example, consider node 110-3 to be in transmission range of the uplink node 110-1 and capable of communicating ordinarily with the uplink node 110-1. Should, however, node 110-3 fail to successfully transmit a packet to the uplink node 110-1, the node 110-3 reruns the discovery of its neighbors. Then, provided the uplink node 110-1 is not in the list of discovered neighboring nodes, the node 110-3 informs these neighbors that the uplink node 110-1 no longer exists. Upon reception of this information, each of these neighboring nodes 110 reruns discovery of its neighboring nodes, propagating the failure of the uplink node 110-1 throughout the node network and reentering the pairing mode. (In the pairing mode, a node seeks out and pairs with an uplink node for purposes of sending tag position updates and associated information to the external network 130).

If there is a backup uplink node 110-2 in the position tracking system 100, eventually that uplink node 110-2 is detected and the position and address of this uplink node 110-2 is distributed using the pairing mechanism described in connection with FIG. 8. In one embodiment, the backup uplink node 110-2 can be programmed to sit idly for a given period, or for a predetermined number of failed pairing efforts with the failed uplink node 110-1, before assuming the role of the main uplink node. Upon determination that the system cannot communicate tracked information because uplink node 110-1 is unreachable, the backup uplink node 110-2 initiates pairing and serves as the main uplink node for the position tracking system 100.

To facilitate the configuration of a large position tracking system, a special configuration version of an uplink node 110-1 can be connected to a computer and application. While the position tracking system is designed to not require user configuration, it may be useful for the purposes of routine maintenance and diagnostics to be able to adjust settings in nodes that may be located out of easy physical reach from the user. This configuration node has the ability to perform individual parts of the UWB ranging system, such as node discovery, and the ability to range with any address specified. A computer interface communicates with the configuration node and shows nearby nodes, their positions, and their ranges. The user can then select a shown node and change the settings stored in non-volatile memory on that node 110, in addition to manually forcing the node into the tag mode for performing self-location.

Alternatively, the nodes can perform this function automatically depending on what function is required by the position tracking system. Each node also has the ability to tell the configuration node which nodes are in range of it, and the ranges to those nearby nodes, which is useful for discovering dead spots and uncovering ranging disturbances. For example, during setup of the position tracking system, if a dead spot appears where there are not enough nodes to perform tag positioning, adding a node 110 to or near the dead spot can gain additional node coverage and eliminate areas of poor node coverage.

In an optional embodiment, another type of tag, referred to as a dynamic tag, may be used in the position tracking system 100. A dynamic tag is designed for tracking objects that move relatively infrequently. This tag includes a UWB radio and an accelerometer, and uploads its position using UWB to the uplink node 110-1. Such a dynamic tag initiates a position update only if the tag senses movement through the accelerometer. After sending its position information to the uplink node 110-1, if the tag becomes stationary it goes into a sleep mode to conserve battery, and awakens only when the tag accelerometer senses movement. For example, a dynamic tag coupled to a package placed on a shipping pallet initially transmits its position (as it has moved since its original placement) and then goes into the sleep mode. When the package is picked up, the dynamic tag awakens and verifies motion. When motion stops for more than a preset duration (e.g., few seconds), the dynamic tag determines its position using UWB, sends its position to the nearest node, and then returns to sleep.

Dynamic tags built in this way have an extremely long battery life, and are, therefore, suitable for distribution in wide numbers. Such tags are also cheaper to manufacture because no USB interface is used. Dynamic tags can also be programmed to operate while moving (as opposed to just operating when they are stationary) to provide more dynamic position information, tracking the actual movement path of the tag as it travels from one stationary position to another stationary position.

Figure 3:
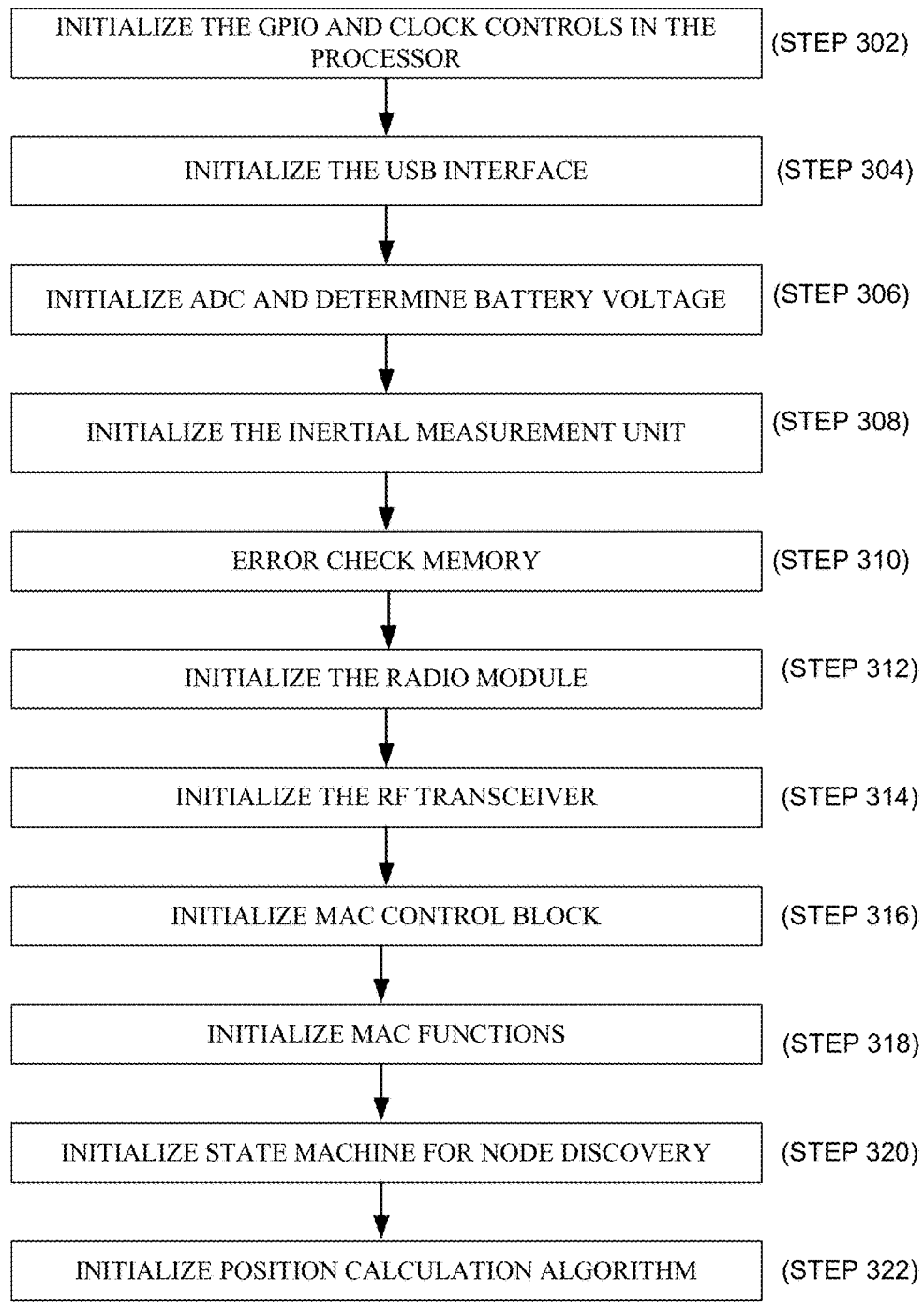
FIG. 3 is a flowchart of an embodiment of a process for initializing a tag.

When a tag 120 is powered up, the tag 120 has a power-up procedure. FIG. 3 shows one example of such a power up procedure 300, which includes the following steps. Reference is made also to elements of FIG. 2.

At step 302, the GPIO and clock controls in the processor 204 initialize. The USB interface initialize at step 304. At step 306, the ADC is initialized, and battery level of the tag is determined. For the embodiment using the Bosch BNO055 device, the sensor 210 is initialized (step 308) into the "9 degrees of freedom mode," and into the "pressure and temperature only" mode; the "automatic "high speed read" and "high resolution" modes are started to allow for >50 Hz updates with an accuracy of 30 cm. At step 310, an image of the EEROM (memory 206) is error checked and the data is loaded into local memory. The radio module 200 (e.g., DW1000 integrated circuit) is initialized at step 312. This initialization establishes normal power-up settings, the channel data rate, and other radio settings, which are stored in the EEROM (memory 206, FIG. 2).

At step 314, the Bluetooth® transceiver, when present and used, is initialized. The media access control (MAC) block of the radio module 200 is initialized (step 316) into 'tag mode," within which the chip is in sleep mode during transmit hold-off, and the default state is also sleep. The MAC functions are initialized (step 318) into tag sleep, in which the radio module 200 is in sleep mode. The state machine of the application executed by the processor 204 (FIG. 2) is initialized (step 320) such that the tag 120 starts by searching for nearby nodes. At step 322, a position calculation algorithm (e.g., the Kalman Filter described subsequently in more detail), which runs at 50 Hz as a high-priority interrupt routine, is initialized and started. Alternatively, a least-mean-squared algorithm is initialized as a low-power calculation routine that does not need to be run at 50 Hz.

Figure 4:
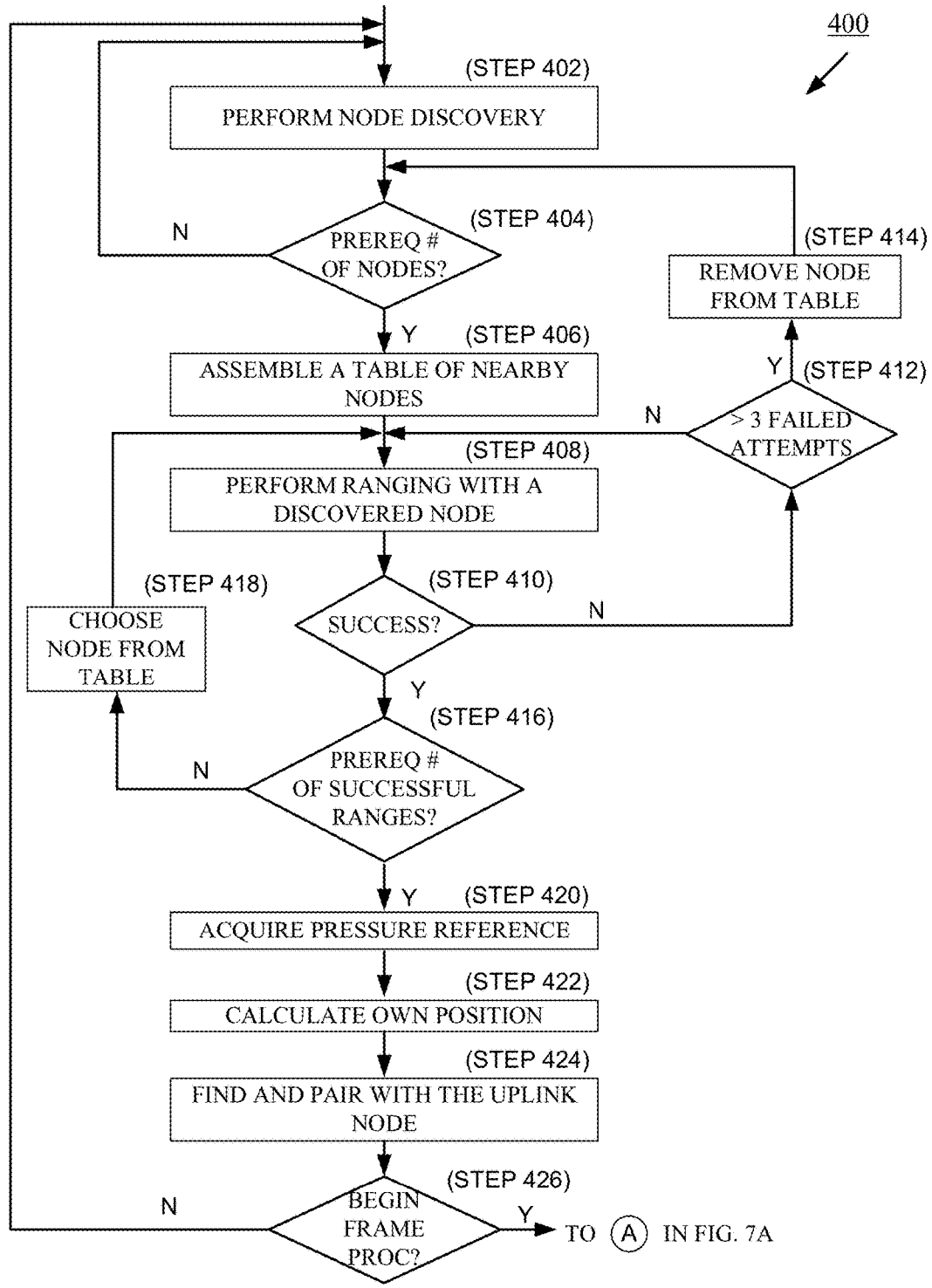
FIG. 4 is a flowchart for an embodiment of a process for configuring the position tracking system, including node discovery and position ranging.

After the uplink node 110-1 is communicating with the nodes 110, with the uplink node 110-1 being identified as the main uplink node and the position of each node 110 being known, the position tracking system 100 can begin to track tags 120. FIG. 4 shows an embodiment of a process 400 performed by a tag 120 to accomplish node discovery and position ranging in the position tracking system 100. Although described in connection with a tag 120, nodes 110 may also use this process 400 to determine its own position in the position tracking system 100. In the description of the process 400, reference is made to elements of FIG. 1.

Each tag 120 begins (step 402) node discovery by searching for local nodes 110 and transmits tag announcement messages while in the node discovery mode. Before it can determine its location, the tag 120 must discover (step 404) multiple nodes 110. Different numbers of nodes 110 may be required by the designer of the position tracking system 100 depending on node density, tracking accuracy requirements, and other factors. Whereas the use of at least three nodes is needed to fix a point in space, more than three nodes improve tracking accuracy. This embodiment of the process 400 requires more than three nodes 110 before the tag 120 exits the node discovery mode.

After enough nodes, for example, at least three nodes, are discovered, or as each node is discovered, the tag 120 assembles (step 406) the information received in response to the transmitted tag announcement messages into a table that stores the physical positions of all nearby nodes 110, including special capabilities (if any) of the nodes and their addresses. The tag 120 may have an incomplete table of nearby nodes because collisions between node announcement replies from nearby nodes may cause some of these messages to be missed by the tag 120. The tag 120 can account for potential collisions by sending multiple tag announcement messages, as the likelihood of consecutive colliding messages from the same two nodes 110 is low.

Upon completing node discovery, the tag 120 determines its location by performing position ranging with each discovered node. At step 408, the tag 120 sends a ranging request message to a given node 110 in the table. This ranging request message prompts the node 110 to reply with a ranging reply message in a deterministic time, the tag 120 noting the time between the reception and transmission of the reply in the message. This tag 120 uses this round-trip time in the calculation of range, as described in detail below. Because ranging accuracy decreases as round-trip delay increases, a ranging reply message is not transmitted through the multiple access scheme described below in connection with FIGS. 11A and 11B. If unable to successfully determine a range to the node 110 (step 410), the tag 120 can repeat (step 412) the attempt, for example, three more times, before removing (step 414) the node from the table and determining again (step 404) whether the tag 120 has discovered enough nodes 110.

If the tag 120 successfully ranges with the node 110, it is determined (step 416) whether the tag 120 has established a predetermined number of successful ranges in the present cycle. If the number has not yet been reached, the tag 120 chooses (step 418) another discovered node 110 from the table and attempts to determine the range (step 408) to that node 110.

As spatial diversity in the vertical direction may be difficult to achieve in practice, additional methods may be used to ensure accurate vertical positioning. Vertical positioning also increases the horizontal positioning accuracy, as the vertical height can be used to restrict the various algorithms' vertical position and compensate for ranging errors. In the embodiment of position tracking system described, barometric pressure is used to provide vertical position. However, barometric pressure sensors require some sort of initial calibration at a known altitude and can drift with weather, which can decrease the accuracy of the vertical positioning. To compensate for these effects, after reaching a predetermined number (e.g., at least four) of successfully established ranges with nodes 110, the tag 120 may acquire (step 420) a pressure reference by transmitting a pressure reference request message.

Nodes respond to pressure reference request messages with pressure reference reply messages. Upon reception of a pressure reference request message, the node returns the barometric pressure at its present location. From the pressure information received by the tag 120, the tag 120 can compensate for drift in its barometric sensor (FIG. 2, 208), making its barometric sensor usable for determining altitude, and providing the common pressure reference for the tag 120 to calibrate the node network within the space of the tag 120. Because the tag already knows the altitude of the node from node discovery, a differential calculation can be performed and, thus, the pressure measurement is compensated from drifting due to atmospheric changes. The tag sends a pressure reference request to the node that is closest to the last calculated tag position after each run-through of the position ranging phase of tag operation to ensure that the tag is compensating its pressure measurement with the node that most accurately represents the same atmospheric space. Although this barometric mechanism improves the stability of the vertical axis, vertical position can also be calculated directly from ranging measurements, and other methods of determining distance above the ground, such as ultrasonic range finding or LIDAR (Light Detection And Ranging).

At step 422, the tag 120 calculates its position based on the determined ranges of at least three discovered nodes and its vertical position (based on its drift-compensated pressure measurement). At step 424, the tag 120 finds and pairs with the main uplink node 110-1. The tag 120 can begin (step 426) network frame processing (FIG. 7A) or return to node discovery.

For instance, if, at any time, the number of valid nodes drops too low to be used for positioning, or the remaining nodes do not have enough spatial diversity to be used for positioning, the tag 120 reenters (step 402) the node discovery mode to look for more nodes. Meanwhile, the tag 120 runs a fusion Extended Kalman Filter (EKF) algorithm based on the IMU and barometric pressure measurements without lost tracking ability (in general, the fusion algorithm fuses inertial data with pressure data). Accordingly, a tag 120 can roam within the range of many nodes 110 without breaks in positioning information.

Figure 5:
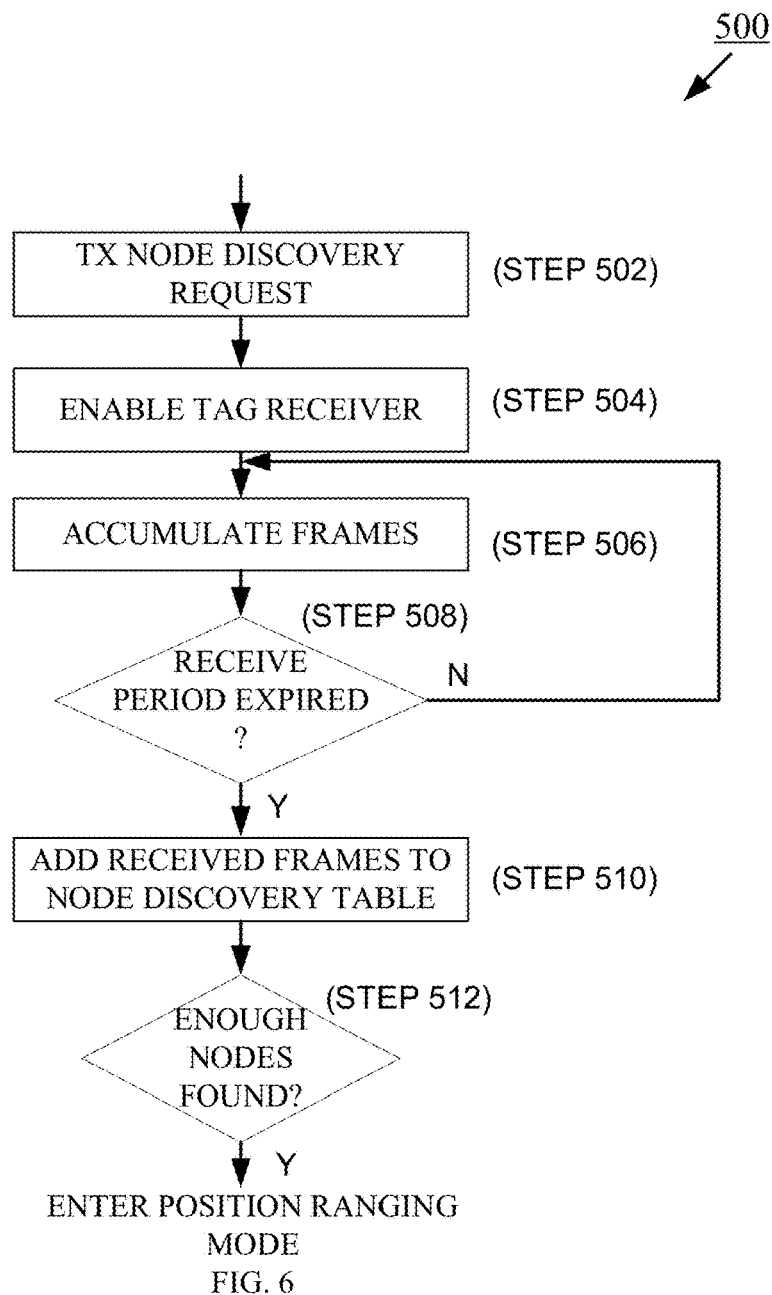
FIG. 5 is a flowchart for an embodiment of a node discovery process.

FIG. 5 shows an embodiment of a process 500 performed by a tag to accomplish node discovery. (Nodes perform a similar process for node discovery.) At step 502, a tag 120 transmits a Tx Node Discovery request. The format of the request ensures all nodes 110 within transmission range receive this message; this node discovery request can contain as little as the address or identification of the tag 120, although additional information, such as diagnostic or other data, can be included. After the tag 120 transmits the node discovery request, the receiver (radio module) of the tag can enter (step 504) a double-buffered mode for a period that exceeds a predefined duration determined to be long enough to allow the tag to receive responses from all neighboring nodes 110. Each node 110 receiving the Tx Node Discovery request replies to the tag 120 with a node announcement message. Because multiple nodes typically respond to this node discovery request, the tag 120 receives and accumulates (step 506) frames of data from multiple node announcement messages equal to the number of nearby nodes 110, provided no transmission collisions occur. Each node announcement message contains various information about the transmitting node 110, including, but not limited to, the physical position in space of the node 110 and any special capabilities the node 110 may have, for example, temperature, humidity, and other sensor data acquired at the node 110. This node announcement message operates to announce the existence of the node 110 to the tag 120 so the tag may perform ranging with the node. After the predefined duration elapses (step 508), the tag 120 adds (step 510) each discovered node to the discovered node table, with the associated information obtained from the node announcement messages. If enough nodes 110 have been discovered in an acceptable spatial diversity to perform position calculations (step 512), the tag 120 enters the position ranging mode.

Figure 6:
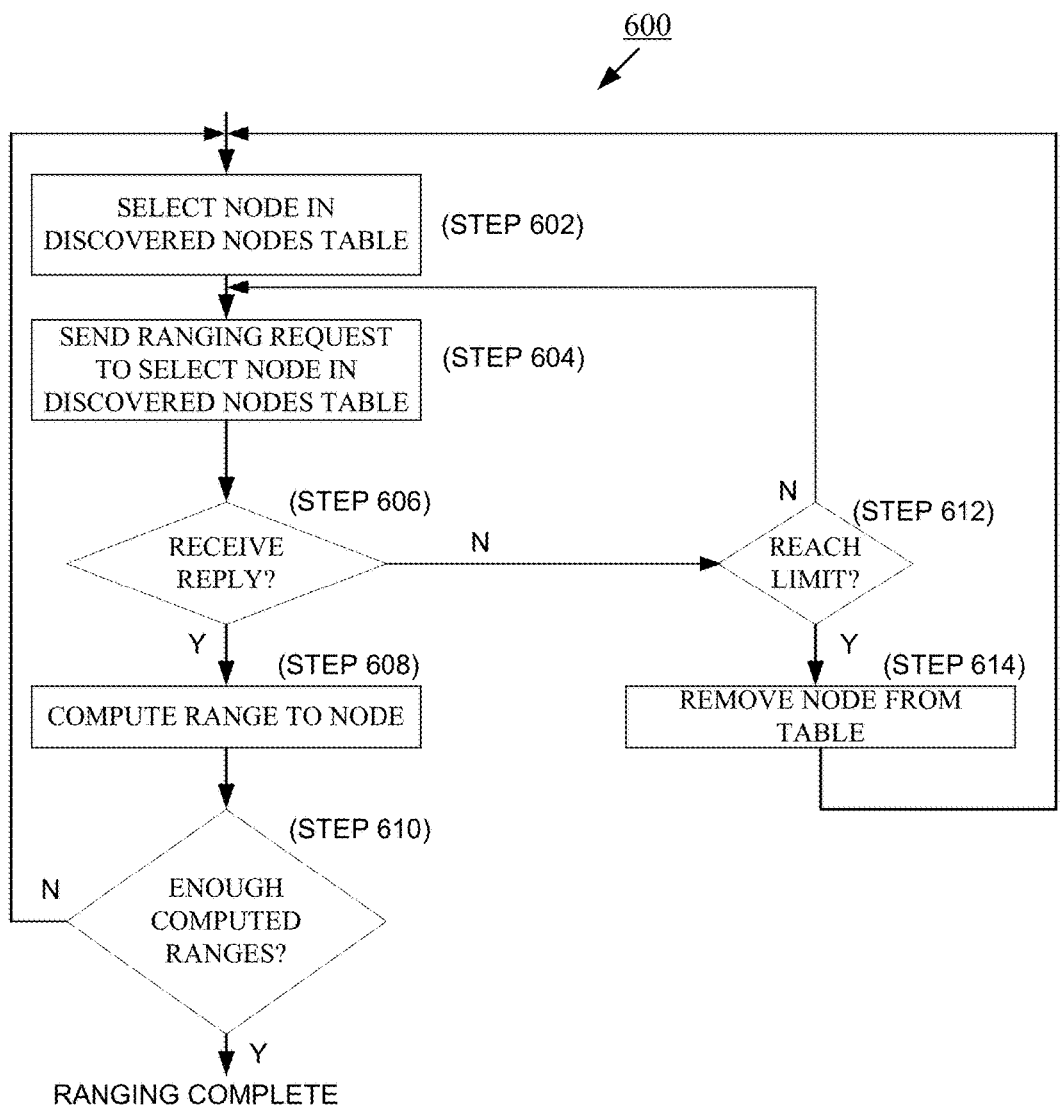
FIG. 6 is a flowchart for an embodiment of a position ranging process.

FIG. 6 shows an embodiment a process 600 performed by a tag 120 in position ranging mode. (Nodes perform a similar process when trying to establish their own location.) When performing position ranging, the tag 120 selects (step 602) a node from the table assembled during the node discovery phase and sends (step 604) a ranging request message to the node. The tag then awaits (step 606) the corresponding ranging reply message from the node. In response to receiving a ranging reply message ("y"), the tag computes (step 608) the range and stores this information. If this computation produces a sufficient number of ranges (step 610), for purposes of position calculation, the tag has completed the position ranging mode. Otherwise, the tag selects (step 612) another node from the table of discovered nodes.

If, instead, a ranging reply message is not received within a timeout period (step 606, "N"), and a limit on the number of retransmissions has not yet been reached (step 612, "N")), a ranging request message is sent (step 604) to the same node again. If such retransmissions occur unsuccessfully a predefined number of times (for example, three times), the tag 120 removes (step 614) the node from the table formed during the node discovery phase, considering this node to be an unreliable source of ranging information for the tag. The tag may then select (step 602) another node from the table of discovered nodes.

In addition to enabling the tracking of an object in three-dimensional space, the position tracking system 100 allows communication among nodes 110, tags 120, and outside networks, including the Internet, through an uplink node. The network architecture is referred to as positional networking, which facilitates the propagation of data packets to the uplink node 110-1 from any node 110 in the system 100 and from any node 110 in the system back to the uplink node 110-1. By propagating data packets to the nearby node that is closest to the destination position, nodes can successfully forward messages correctly while only maintaining a list of adjacent nodes and their respective positions. This manner of data propagation allows for a highly scalable network using only one uplink node 110-1 and without the need for a central controller.

Figure 7A:
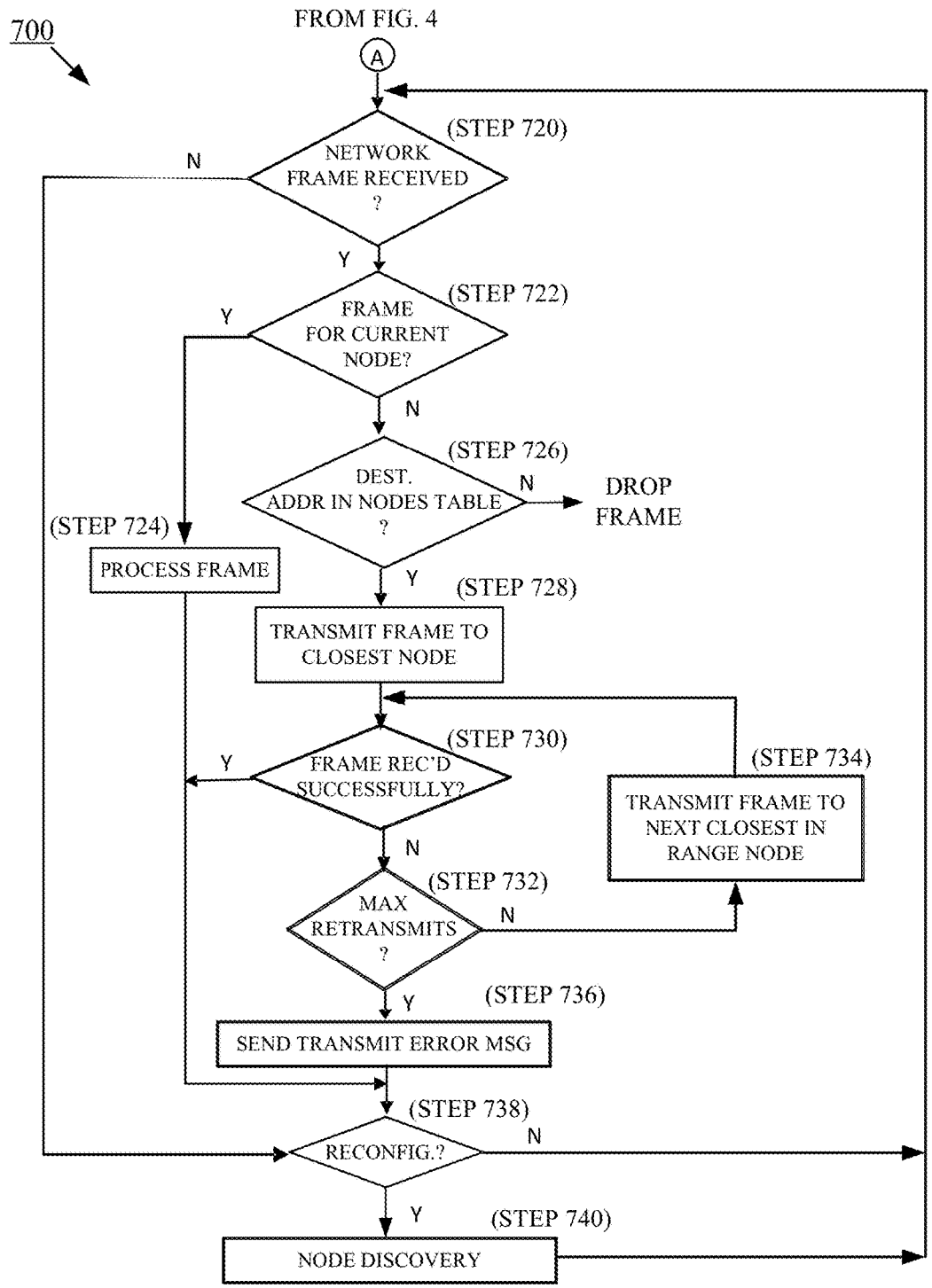
FIG. 7A is a flowchart for an embodiment of a process for network frame processing
Figure 7B:
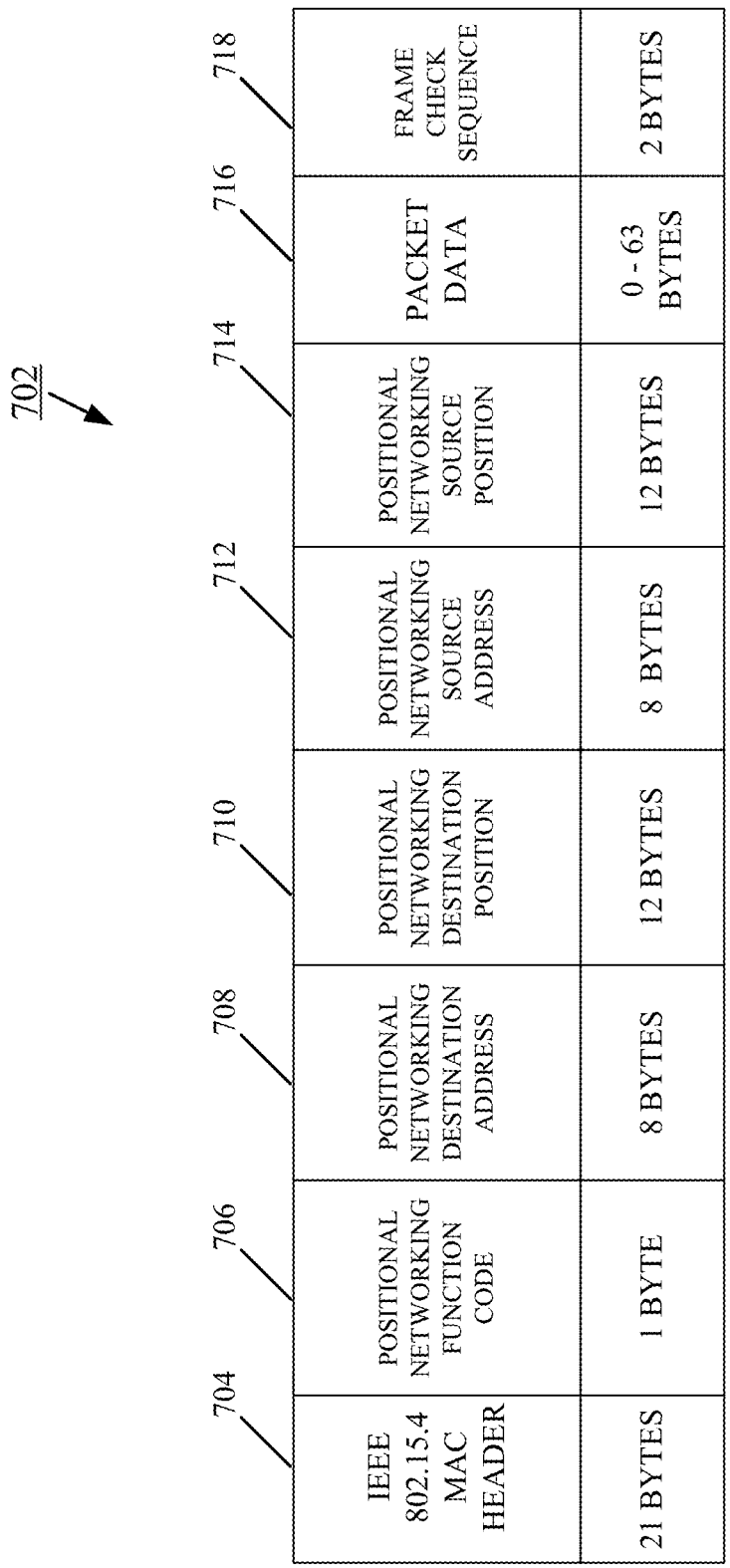
FIG. 7B is a diagram of an embodiment of a format for a network frame.

FIG. 7A shows an embodiment of a process 700 performed by nodes 110 to process network frames passed between nodes 110 in communication with each other. (Tags may also perform the process 700 when they take on the "node" role, for example, to help track tags that might be out of range of other tags.) FIG. 7B shows the structure of one embodiment of a network frame 702, which includes a MAC header 704, a field 706 for a positional networking function code, which can be just a byte of the communication frame used to differentiate frame types, a field 708 for a positional networking destination address, a field 710 for a positional networking destination position, a field 712 for a positional networking source address, a field 714 for a positional networking source position, packet data 716, and a frame check sequence 718.

Referring back to FIG. 7A, a node 110 determines whether it has received (step 720) a network frame 600. If the node receives a network frame, the receiving node determines (step 722) if the destination address 606 of the frame is its own destination address. If the addresses match, the receiving node processes (step 724) the frame. Otherwise, if the addresses do not match ("N"), the receiving node 110 checks (step 726) to see if the destination address is in its table (i.e., list) of adjacent discovered nodes. If the destination address does not match the address of an adjacent node or its own address, the receiving node 110 drops the frame.

If the destination address is in the table, the receiving node 110 sends (step 728) the frame to an adjacent node closest to the receiving node 110. At step 730, the receiving node determines whether its transmitted frame was received successfully. If not, the receiving node determines (step 732) whether it has reached a maximum limit of retransmissions of the frame. If the limit has not yet been reached, the receiving node transmits (step 734) the frame to another node in its list of adjacent nodes, choosing that node with the smallest Euclidean distance from the destination node using the NHRP. If, instead at step 732, it is determined that the maximum number of transmits has been performed, it is deemed likely that one of the nearby nodes is now offline. The node sends (step 736) a transmit error message to either neighboring nodes or, if the node is an uplink node, it can transmit the error message directly to the external network. At step 738, the node determines whether to reconfigure. (Reconfiguring may also be performed if, at step 720, the node does not receive a network frame.) If the node decides to reconfigure, the receiving node returns to node discovery (step 740) to rediscover its neighbor nodes. If the determination is not to reconfigure, or after node discovery completes, frame processing continues at step 720.

Figure 8:
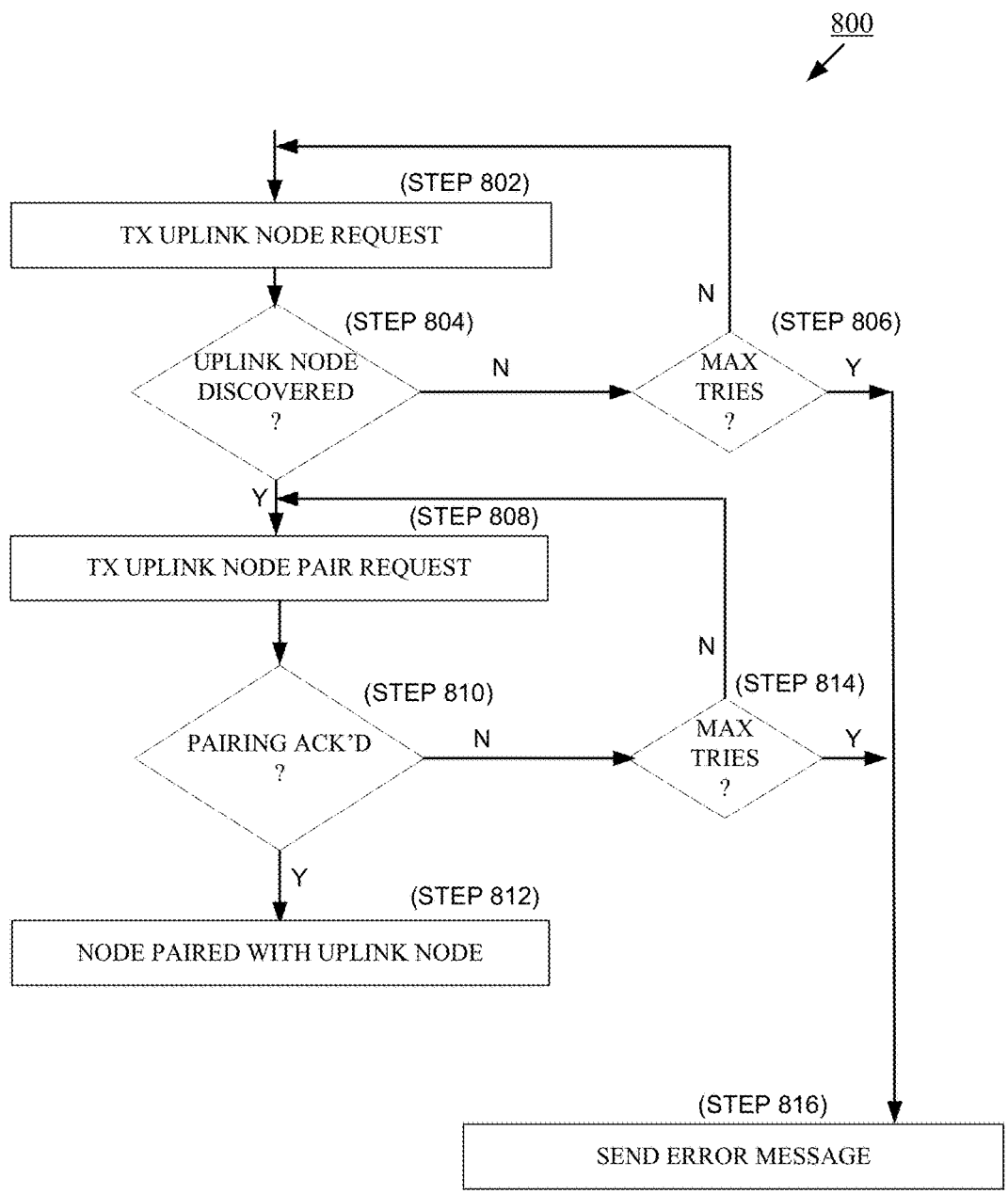
FIG. 8 is a flowchart for an embodiment of a process for finding and pairing to an uplink node.

FIG. 8 shows an embodiment of a process 800 performed by nodes to find and pair with an uplink node. In this description of the process 800, reference is made to elements of FIG. 1. When a node 110 is brought on-line (added to the system), provided the node has been pre-programmed with or otherwise knows its position, that node determines the positions of all other nodes nearby. The newly added node sends an uplink node request (step 802) to each other node 110 for the address and position of an uplink node.

When queried directly, an uplink node (e.g., 110-1) responds with its own position and address (or identifier). When a node that is not an uplink node receives the query, the node responds with information about the identity and location of the uplink node, provided the node possesses the information; by receipt of this information the newly added node acquires the position of, and has thus discovered (step 804, "y") the uplink node. If, instead, an uplink node is not discovered (step 804, "n"), the newly added node retransmits (step 802) the uplink node request, and continues to retransmit uplink node requests until the uplink node is discovered or a maximum number of attempts (step 806) is reached. If the maximum number is reached, an error message is sent (step 816) to the external network, identifying a problem.

After discovering the uplink node, the newly added node sends a message to the uplink node, notifying the uplink node of its presence, and requesting to be paired with the uplink node (step 808). If the uplink node accepts the pair request (step 810, "y"), then the newly added node is paired (step 812) with the uplink node. In general, pairing means the newly added node has established a connection and a link to allow the node to communicate with the uplink node. Optionally, the uplink node 110 receives a message to take note of the newly added node, and sends an acknowledgement message so that newly paired node knows that the uplink node has been successfully detected. If pairing is unsuccessful (step 810, "n"), and the maximum number of pair request retransmissions is reached (step 814, "y"), then an error message is sent (step 816) to the external network.

Figure 9:
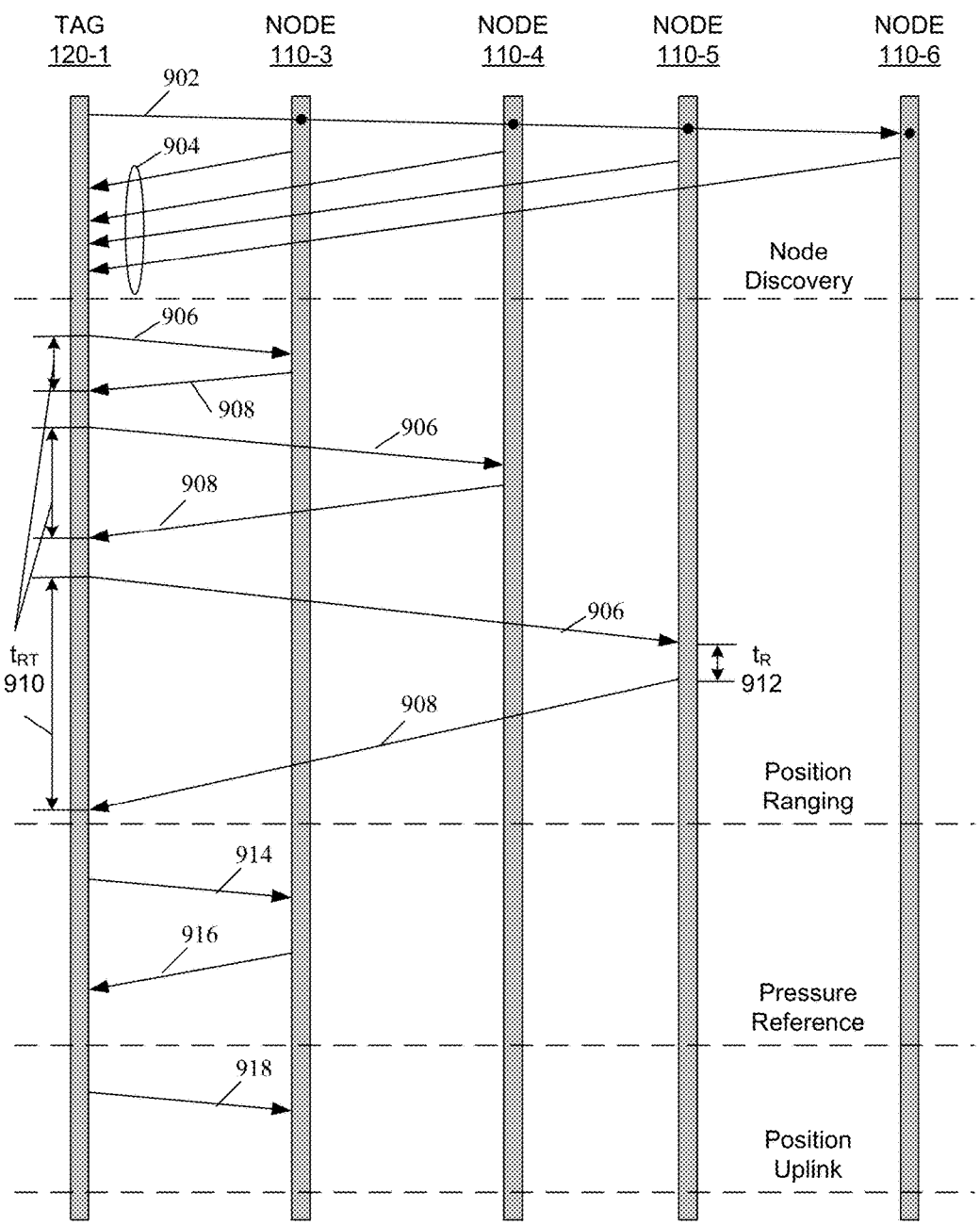
FIG. 9 is an illustration of an example of the processes of node discovery and position ranging.

FIG. 9 illustrates, by example, the processes of node discovery and position ranging performed by a tag 120-1 with each of the nodes 110-3, 110-4, 110-5, and 110-6 (FIG. 1). To perform node discovery, the tag 120-1 transmits a tag announcement message 902 received by these nodes 110-3, 110-4, 110-5, and 110-6. Each of these nodes responds with a node announcement message 904. From these node announcement messages 904, the tag 120-1 produces a table (or list) of discovered nodes.

To perform ranging, the tag 120-1 transmits messages 906 to at least three of the nearest nodes in the table, which, in the present example, are nodes 110-3, 110-4, and 110-5. In this example, the tag 120-1 sends a message first to node 110-3, then to node 110-4, and then to node 110-5. The order in which the tag sends messages to the nodes can be different, as can be the set of nodes to which the messages are sent. Each node 110-3, 110-4, and 110-5 sends a reply message 908 to the tag 120-1. As shown, the tag 120-1 awaits a reply 908 from one node before sending a message 906 to the next node. The tag 120-1 calculates the distance (i.e., range) from each node to the tag based on the round-trip ($t_{RT}$) time 910 for the signal to travel from the tag 120-1 to the node and back again. The calculation may factor in an estimate for time ($t_R$) 912 taken by the node to process the signal from the tag and produce a reply.

The tag 120-1 may optionally send a message 914 to the physically closest node (e.g., 110-3) requesting a pressure measurement. In response, the node sends a message 916 containing a pressure reading made by that node. The tag 120-1 calculates its position based on the computed ranges to the at least three nodes and, optionally, its own pressure measurement compensated accordingly based on the pressure reading provided by the node.

In addition, the tag 120-1 can send a message 918 to one of the nodes (e.g., 110-3) containing its calculated position, for forwarding to the uplink node 110-1 and eventual transmission to the server on the external network.

A tag 120 can calculate its position using a number of algorithms. One embodiment uses a fusion of a least-mean-squares (LMS) algorithm and a barometric pressure sensor. The LMS is used to compute the horizontal position of the tag 120, while the height or altitude is calculated using the differential barometric pressure scheme. This algorithm is run every time the tag 120 completes a run-through of the nearby nodes and receives a pressure reference from the closest node. This algorithm is suited for extremely low-power situations, as each iteration of the algorithm produces a position and the tag can be put to sleep between each position update.

An alternative algorithm uses a fusion of range measurements, similar to that described above, an inertial measurement unit (IMU) measurement, and a barometric referenced pressure measurement using an extended Kalman Filter. The Kalman Filter is more fully described in "*An Introduction to the Kalman Filter*" by Greg Welch and Gary Bishop, TR 95-041, Department of Computer Science, University of North Carolina at Chapel Hill, Chapel Hill, N.C. 27599-3175, Updated: Monday, Jul. 24, 2006.

The above reference to the Kalman Filter is hereby incorporated by reference in its entirety as if set forth at length herein. The algorithm is running at a speed much higher than the rate of the tag positioning updates and works to fill the gaps when the tag fails to connect with enough nodes. When the tag fails to discover at least three nodes nearby, this algorithm runs based on the IMU measurement and the referenced barometric pressure measurement to continuously track the tag's position.

The Kalman Filter estimates a process using feedback control and includes two steps: time update (predict) and measurement update (correct). (The variables used are defined in the Kalman reference noted previously.)

Figure 10:
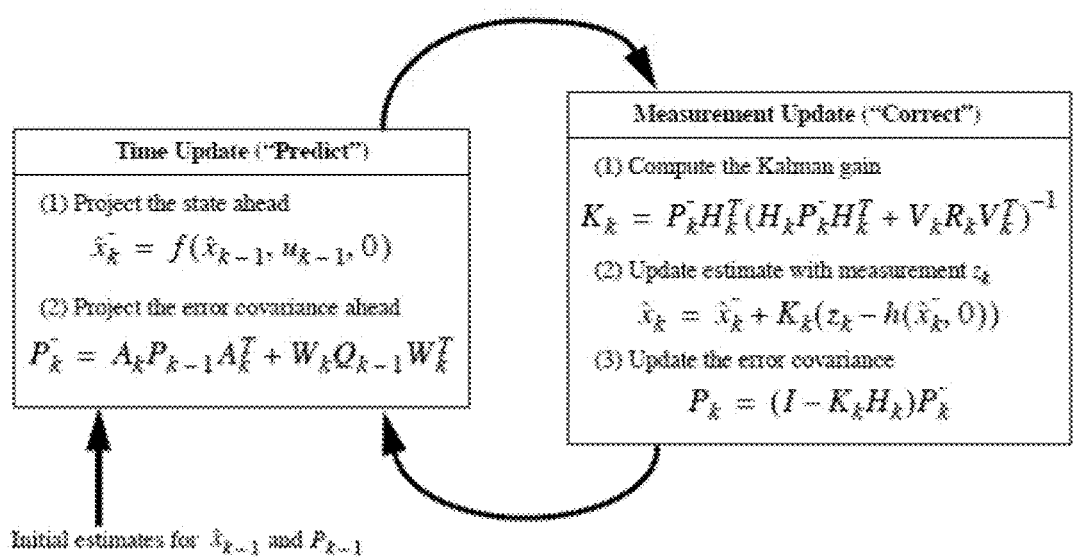
FIG. 10 illustrates two main steps of a Kalman Filter used by a position calculation algorithm.

FIG. 10 shows the two major steps of the Kalman Filter being the Time Update (Predict) step followed by the Measurement Update (Correct) step. In one embodiment, the state vector chooses:

$$X_k = [x_k y_k z_k v_{xk} v_{yk} v_{zk} a_{xk} a_{yk} a_{zk}]'$$

The Time Update equations:

$$X_k^- = A X_{k-1}$$

$$P_k^- = A P_{k-1} A' + Q_k$$

Where $$A = \begin{bmatrix} I_{3x3} & T I_{3x3} & \frac{T^2}{2} I_{3x3} \\ 0_{3x3} & I_{3x3} & T I_{3x3} \\ 0_{3x3} & 0_{3x3} & I_{3x3} \end{bmatrix} \text{ and}$$

$$Q_k = \begin{bmatrix} \frac{W}{20} T^5 I_{3x3} & \frac{W}{8} T^4 I_{3x3} & \frac{W}{6} T^3 I_{3x3} \\ \frac{W}{8} T^4 I_{3x3} & \frac{W}{3} T^3 I_{3x3} & \frac{W}{2} T^2 I_{3x3} \\ \frac{W}{6} T^3 I_{3x3} & \frac{W}{2} T^2 I_{3x3} & W T I_{3x3} \end{bmatrix}$$

The Measurement Update equations:

$$h(X_k^-) = \begin{bmatrix} \sqrt{(x_k^- - N_{x,1})^2 + (y_k^- - N_{y,1})^2 + (z_k^- - N_{z,1})^2} \\ \sqrt{(x_k^- - N_{x,2})^2 + (y_k^- - N_{y,2})^2 + (z_k^- - N_{z,2})^2} \\ \cdots \\ \sqrt{(x_k^- - N_{x,n})^2 + (y_k^- - N_{y,n})^2 + (z_k^- - N_{z,n})^2} \\ a_{x,k}^- \\ a_{y,k}^- \\ a_{z,k}^- \end{bmatrix}$$

where $a_{x,k}^-$, $a_{y,k}^-$, $a_{z,k}^-$ are transferred acceleration from body to local frame.

In FIG. 10, the Jacobian $$H_k = \frac{\sigma(h(X_k^-))}{\sigma X_k^-}$$

By using real time position updates supplemented by Kalman Filter estimates or inertial sensor data, position tracking accuracy is improved.

In order for an accurate tag position to be calculated, nodes must be separated by a distance far larger than the accuracy of the ranges generated between either node to tag, or node to node. This ensures that the effect of ranging errors only contributes a small effect on the overall accuracy of positioning.

A challenge for widespread adoption of the kind of de-centralized position tracking system described herein is in creating a reliable and efficient multiple-access networking scheme. The main problem with using a system like CSMA (Carrier Sense Multiple Access) is that a UWB signal is very low-power and thus difficult to detect. As a result, providing a reliable carrier-sense signal is not possible using ultra-wideband communication. The scheme outlined below is an improvement in reliability on the ALOHA scheme (transmit-at-will) currently used by industry, but still maintains a high level of simplicity, balancing power consumption and processor complexity.

Figure 11A:
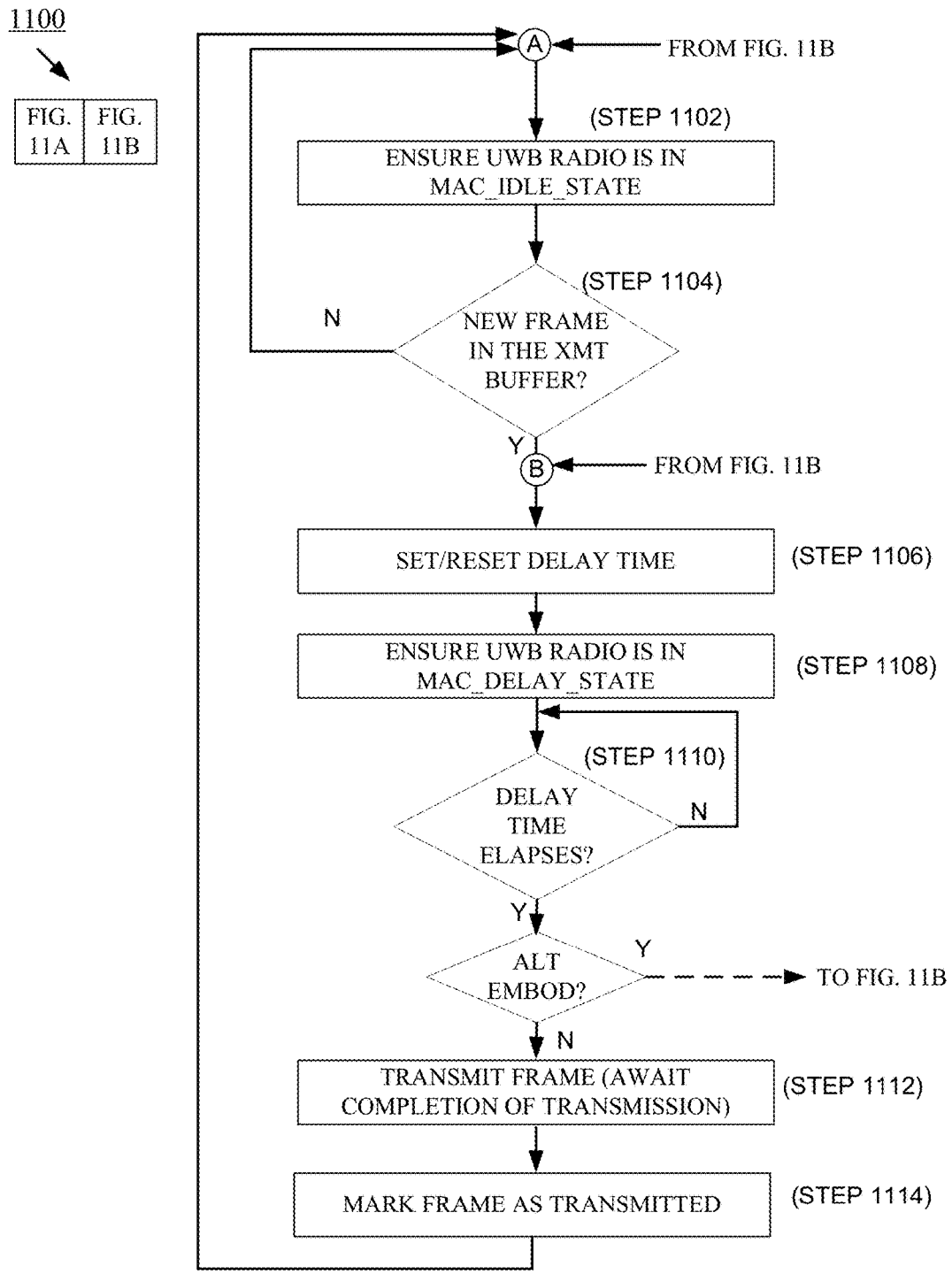
FIGS. 11A, 11B together are a flowchart illustrating the functioning of a multiple access communication scheme.
Figure 11B:
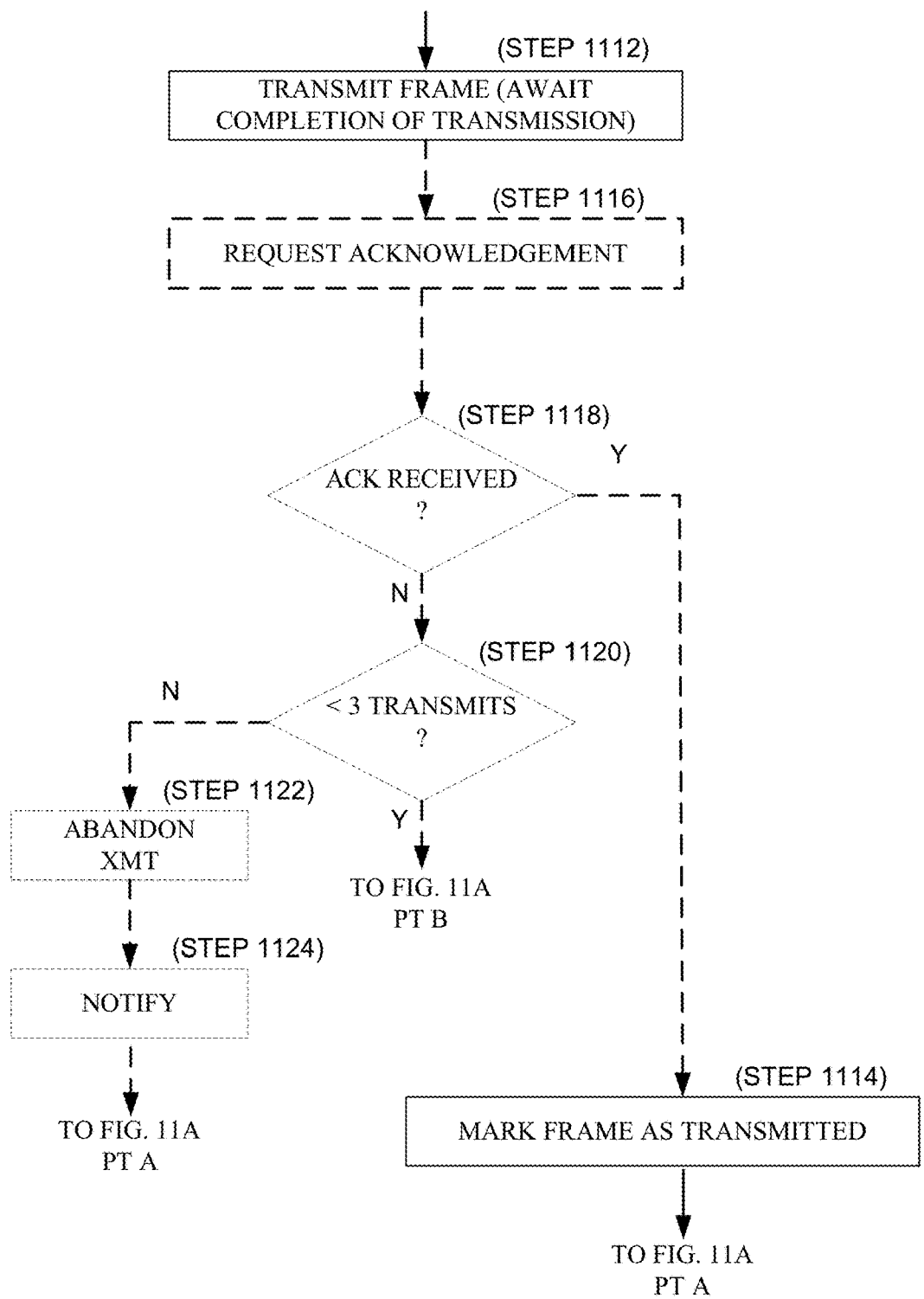

FIGS. 11A, 11B together show an embodiment of a multiple access communication scheme 1100, which comprises two main parts: a maximal-length linear-feedback shift register (ML-LFSR) initialized to the UWB radio's network address or some other universally-independent value; and a system for accurately delaying the transmission of frames by the time specified by the maximal-length shift register. Nodes and tags can perform this scheme. After the UWB is in the idle state (step 1102), packet transmission occurs in three distinct stages. In the first stage, the application (i.e., the communication scheme) places (step 1104) a frame into a transmit buffer. To prevent buffer overruns, this transmit buffer is large enough to handle the queuing of the maximum number of frames that the application can generate during the maximum time delay possible from the ML-LFSR. At step 1106, the ML-LFSR is programmed with this maximum time delay.

In the second stage, after the multiple access routine finds a new frame in the buffer (step 1104, "Y"), the application transitions the UWB radio from the idle state to a delay state and takes note of the current value of the ML-LFSR, which is updated at a rate faster than the maximum rate of packet transmission. When the UWB radio enters the delay state, the multiple access controller (i.e., processor 204, FIG. 2) loads the current frame into the transmit buffer of the UWB radio and waits (step 1110) the amount of time allotted by the value taken from the ML-LFSR.

Upon this timer completing, the multiple access controller begins the third stage. The multiple access controller initiates (step 1112) transmission of the UWB frame, awaits a signal from the UWB radio signifying that transmission has occurred and is complete, marks (step 1114) the frame as transmitted, and then returns (step 1102) the UWB radio to the idle state to check for new frames in the transmit buffer.

FIG. 11B shows an alternative third stage for an embodiment requiring a high level of reliability in the transmission of the desired frame. Steps drawn with dashed lines show additional optional steps taken when performing this alternative third stage. With the transmission (step 1112) of the frame, acknowledgement is implicitly or explicitly requested (step 1116). The multiple access controller awaits (step 1118) the reception of an acknowledgement frame from the destination node of the transmitted frame. If an acknowledgement is timely received (step 1118, "Y"), the multiple access controller marks (step 1114) the frame as transmitted, returns (step 1102, FIG. 11A) the UWB radio to the idle state, and checks for new frames in the transmit buffer.

If this acknowledgement message is not received within a specified period of time (step 1118, "N"), and the limit of retransmissions has not been reached (step 1120, "y"), the multiple access controller causes the UWB radio to reenter the delay state (steps 1106, 1108, FIG. 11A), gets a new delay time from the ML-LFSR, and retransmits the same frame (step 1112, FIG. 11B). If retransmitting the same frame fails to produce the reception of a valid acknowledgement frame after three consecutive retransmissions (step 1120, "n"), the transmission of the frame is abandoned (step 1122) and the application is notified (step 1124). The multiple access controller then returns (step 1102, FIG. 11A) the UWB radio to the idle state and checks for new frames in the transmit buffer.

As will be appreciated by one skilled in the art, aspects of the systems described herein may be embodied as a system, method, and computer program product. Thus, aspects of the systems described herein may be embodied in entirely hardware, entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. The references to a particular embodiment within the specification do not all necessarily refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. A position tracking system comprising:
   at least three spatially separated radiofrequency (RF) sources of radio signals, each RF source being disposed in an area at a location known to that RF source, each RF source including an RF transmitter configured to transmit radio signals that carry a unique identifier and the known location of that RF source; and
   at least one tag each coupled to a different mobile object, each tag including a radio module with an RF receiver for receiving the radio signals transmitted by the at least three spatially separated RF sources, memory storing executable code, and a processor that executes the executable code stored in the memory compute a range from that tag to each of the at least three spatially separated RF sources, a given tag of the at least one tag including a barometric sensor, the processor of the given tag computing a position of the given tag based on the at least three ranges computed by the processor of the given tag and on a pressure measurement made by the barometric sensor of the given tag.

2. The position tracking system of claim 1, wherein one or more of the at least three spatially separated RF sources of radio signals is a stationary node.

3. The position tracking system of claim 1, wherein one or more of the at least three spatially separated RF sources of radio signals is an uplink node having an uplink module that is in communication with an external network and configured to send the computed position of the at least one tag to a server system on the external network.

4. The position tracking system of claim 3, wherein the uplink node is a configuration node, and the processor of the configuration node is configured to command a given RF source of the at least three RF sources to enter tag mode in which the given RF source computes its location.

5. The position tracking system of claim 1, wherein one of the at least three spatially separated RF sources of radio signals is a second tag of the at least one tag.

6. The position tracking system of claim 1, wherein each of the at least three RF sources includes a barometric sensor for making pressure measurements, and wherein the radio module of the given tag includes an RF transmitter, the processor of the given tag being configured to cause the RF transmitter to send a message addressed to a specific RF source of the at least three RF sources, the message requesting a pressure measurement made by the barometric sensor of that specific RF source.

7. The position tracking system of claim 6, wherein the RF receiver of the given tag receives a reply message containing the pressure measurement made by the barometric sensor of the specific RF source, and the processor of the given tag is configured to adjust the pressure measurement made by the barometric sensor of the given tag in response to the pressure measurement received from the specific RF source before computing the position of the tag based on the at least three computed ranges and on the pressure measurement made by the barometric sensor of the given tag.

8. The position tracking system of claim 6, wherein the processor of the given tag is configured to select the specific RF source from among the at least three RF sources in order to send the message requesting a pressure measurement based on proximity to the given tag.

9. The position tracking system of claim 1, wherein the given tag of the at least one tag further includes an accelerometer that detects when the given tag moves and when the tag is stationary, and the processor of the given tag is configured to place the given tag in sleep mode to conserve power when the given tag ceases moving and becomes stationary.

10. The position tracking system of claim 9, wherein the radio module of the given tag includes an RF transmitter, and the processor of the given tag is configured to cause the given tag to exit sleep mode and the RF transmitter to send a message addressed to a specific RF source of the at least three RF sources in response to the accelerometer detecting motion of the given tag, the message including the position computed by the given tag and requesting that the computed position of the given tag be sent to an RF source in communication with an external network.

11. The position tracking system of claim 1, wherein the radio module of the given tag of the at least one tag includes an RF transmitter, and the processor of the given tag is configured to cause the RF transmitter to send a message addressed to a specific RF source of the at least three RF sources, the message containing the position computed by the given tag and requesting that the computed position of the given tag be sent to an RF source in communication with an external network.

12. The position tracking system of claim 11, wherein the processor of the given tag is configured to place the given tag in sleep mode to conserve power after sending the message that requests the computed position of the given tag be sent to an RF source in communication with an external network.

13. A method of position tracking system comprising:
receiving, by a tag coupled to a mobile object, radio signals from at least three spatially separated radio-frequency (RF) sources;
acquiring, by the tag, a unique identifier for and known location of each of the at least three RF sources from the radio signals received from that RF source;
measuring, by the tag, pressure;
computing, by the tag, a range to each of the at least three RF sources from communications exchanged with that RF source; and
computing, by the tag, a three-dimensional position of the tag based on the computed ranges to the at least three RF sources and on the pressure measured by the tag.

14. The method of claim 13, further comprising:
sending, by the tag, a message to a physically closest RF source of the at least three RF sources;
receiving, by the tag, a reply message containing pressure data from the physically closest RF source of the at least three RF sources in response to the sent message; and
adjusting the pressure measured by the tag in response to the pressure data received from the physically closest RF source of the at least three RF sources before computing the three-dimensional position of the tag based on the computed ranges to the at least three RF sources and on the pressure measured by the tag.

15. The method of claim 14, further comprising:
detecting, by the tag, when the tag moves and when the tag is stationary; and
entering, by the tag, sleep mode to conserve power when the tag ceases moving and becomes stationary.

16. The method of claim 15, further comprising:
exiting sleep mode and transmitting, by the tag, the computed position in a message addressed to a specific RF source of the at least three RF sources in response to detecting motion of the tag; and
requesting, by the message, that the specific RF source forward the computed position to an RF source that is in communication with an external network.

17. The method of claim 14, further comprising:
transmitting, by the tag, the computed position in a message addressed to a specific RF source of the at least three RF sources; and
requesting, by the message, that the computed position of the given tag be sent to an RF source in communication with an external network.

18. The method of claim 17, further comprising placing the tag in sleep mode to conserve power after transmitting the computed position in the message addressed to the specific RF source of the at least three RF sources.

* * * * *